United States Patent
Otsuka et al.

(10) Patent No.: US 7,512,252 B2
(45) Date of Patent: Mar. 31, 2009

(54) IMAGE PROCESSING SYSTEM AND VEHICLE CONTROL SYSTEM

(75) Inventors: Yuji Otsuka, Hitachi (JP); Hiroshi Takenaga, Tokai (JP); Shoji Muramatsu, Hitachi (JP); Tatsuhiko Monji, Hitachinaka (JP); Isao Furusawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 675 days.

(21) Appl. No.: 10/915,603

(22) Filed: Aug. 11, 2004

(65) Prior Publication Data

US 2005/0036660 A1    Feb. 17, 2005

(30) Foreign Application Priority Data

Aug. 11, 2003   (JP)   ............................. 2003-206997
May 14, 2004    (JP)   ............................. 2004-144788

(51) Int. Cl.
  *G06K 9/00*   (2006.01)
  *G01C 21/00*  (2006.01)
(52) U.S. Cl. ...................................... 382/104; 701/207
(58) Field of Classification Search .............. 250/208.1; 315/77; 382/104; 701/207
  See application file for complete search history.

(56) References Cited

U.S. PATENT DOCUMENTS 6,097,023 A   8/2000  Schofield et al.

2002/0040962 A1   4/2002  Schofield et al.
2002/0060522 A1*  5/2002  Stam et al. .................... 315/82
2002/0156559 A1* 10/2002  Stam et al. .................... 701/36
2003/0138132 A1   7/2003  Stam et al.

FOREIGN PATENT DOCUMENTS

JP    08-166221    6/1996
JP    08-193831    7/1996

(Continued)

OTHER PUBLICATIONS

Sukthankar, "Raccon: A Real-time Autonomous Car Chaser Operating Optimally At Night", Jul. 14-16, 1993, pp. 37-42.*

(Continued)

*Primary Examiner*—Jingge Wu
*Assistant Examiner*—Amara Abdi
(74) *Attorney, Agent, or Firm*—Antonelli, Terry, Stout & Kraus, LLP.

(57) ABSTRACT

The invention provides an image processing system capable of precisely locating the positions of the light spots covering near headlights through far tail lamps by using one camera. The invention, discriminating the headlights and tail lamps from noise lights such as a traffic light, streetlight, and vending machine, enhances the vehicle detection performance at night. The system includes an image input means that inputs images in front of a vehicle, an image analysis means that analyzes the images inputted by the image input means. The image input means has a means of photographing more than two images with different exposures. The image analysis means analyzes the images photographed by the image input means to transform them into the position information of the vehicles traveling in front.

6 Claims, 21 Drawing Sheets

FOREIGN PATENT DOCUMENTS

| | | |
|---|---|---|
| JP | 09-073529 | 3/1997 |
| JP | 09-266545 | 7/1997 |
| JP | 2000-137899 | 5/2000 |
| JP | 2000-217100 | 8/2000 |
| JP | 2001-006089 | 1/2001 |
| JP | 2001-519744 | 10/2001 |
| WO | WO 98/43850 | * 10/1998 |

OTHER PUBLICATIONS

Patent Abstracts of Japan, vol. 18, No. 687, Dec. 26, 1994.

Yamada, et al., "A Vision Sensor Having An Expanded Dynamic Range For Autonomous Vehicles", vol. 47, No. 1, Feb. 1, 1998, pp. 332-341.

Defauw, et al., "A system for small target detection, tracking, and classification", Oct. 5-8, 1999, pp. 639-644.

Otsuka, et al., "Multitype lane markers recognition using local edge direction", Jun. 17-21, 2002, vol. 2, pp. 604-609.

R. Sukthankar, "Racoon: A Real-time Autonomous Car Chaser Operating Optimally At Night", Jul. 14-16, 1993, pp. 37-42.

* cited by examiner

IMAGE PROCESSING SYSTEM AND VEHICLE CONTROL SYSTEM

FIELD OF THE INVENTION

The present invention relates to an image processing system mounted on a vehicle and a vehicle control system.

BACKGROUND OF THE INVENTION

There is a technique of detecting locations and directions of other vehicles by using images photographed by a camera mounted on a vehicle. The technique detects headlights and tail lamps of the other vehicles at night to generate information of the other vehicles on the basis of the detected information. It is preferable to set the headlights to high beams during traveling at night if there is not a vehicle in front in order to better the visibility of a driver, and to set the headlights to low beams according to the vehicular distance if there is in front. Therefore, it is essential for the technique to detect the distance from the own vehicle to a preceding vehicle in front or an opposing vehicle. As a method of calculating a vehicular distance, the camera mounted on the vehicle photographs the front state of the vehicle, and analysis of photographed images is performed to thereby calculate the vehicular distance. Since it has a limited dynamic range, a CCD or CMOS camera has the difficulty in uniformly photographing an object having such a large difference of intensity as that between the headlights and the tail lamps. In addition, since the incident quantity of light into the camera is dependent on a distance from a light spot, if the headlights are near and the tail lamps are far, the apparent difference of intensity will further expand. Human eyes usually dazzle, even if they are about 200 m far from the high beams. Therefore, the light distribution control is required to detect even a vehicle of some hundred meters distant. To adjust the exposure to the intensity of the far tail lamps will cause a blooming with strong possibility, because the quantity of light from the near headlights is too abundant. And, to adjust the exposure to the intensity of the near headlights will make the far tail lamps dim, which makes the calculation of distance difficult.

In order to solve this problem, there is a well-known technique, which prepares an imaging device having a lens with a blue filter mounted on and an imaging device having a lens with a red filter mounted on. The blue filter detects the headlights of an opposing vehicle, and the red filter detects the tail lamps of a preceding vehicle. For example, the method of the Patent document 1 saves a mechanical scanning device, and realizes an inexpensive system with a simplified construction. However, it employs two imaging devices and two lenses, and imposes double the cost on the optical system. Since each of these two recognizes the headlights and the tail lamps separately, it is possible to absorb the difference of intensity due to the difference of the headlights and the tail lamps, but it is difficult to absorb the difference of intensity due to the difference of distance. Accordingly, if there are a vehicle near and a vehicle far at the same time, the blooming and so forth will lower the detection accuracy of the locations of the vehicles.

Further, the mixture of noise light spots such as a traffic light, streetlight, and vending machine into the light spots of vehicles becomes a subject of discussion on the detection of the headlights and tail lamps. The detection of vehicles is essential to the application software of the light distribution control, ACC, and pre-crush safety and so forth. The light spots other than those of the vehicles have to be excluded as the noises. However, if the above noise light spots are mixed, they will be falsely recognized as the light spots of the vehicles, which will give a serious influence to the behavior of the application software. In order to eliminate the influence of these noise light spots, the Patent document 1 proposes the method of excluding the light spot of a streetlight. This method utilizes the characteristics of the light spot of a streetlight to thereby differentiate the headlights and the tail lamps. That is, the Patent document 1 describes that the exclusion is possible through utilizing the fact that the light spot shifts to the upper part of the screen as the vehicle continues to travel, or by utilizing the flicker inherent to the fluorescent lamps.

[Patent Document 1] JP-A No.519744/2001

SUMMARY OF THE INVENTION

However, in case of using a general NTSC camera, the method utilizing the flicker of the fluorescent lamps is not realistic, and it is not totally useful for a traffic light not using a fluorescent lamp. In view of simply sifting upward, the tail lamps of a bus, which are located at a higher position, show the same behavior; therefore, it is practically difficult to differentiate them.

The invention provides an inexpensive image processing system capable of precisely locating the positions of light spots covering near headlights through far tail lamps by means of one camera. The invention also intends to enhance the vehicle detection performance at night while discriminating the headlights and tail lamps from noise lights such as a traffic light, streetlight, and vending machine, and intends to provide a further advanced function.

According to one aspect of the invention, the image processing system includes one camera (imaging means) mounted on a vehicle, and an image analysis means that analyzes plural images photographed by the camera. The image analysis means analyzes the plural images with different exposures that the camera photographed, and detects the positions of the other vehicles traveling in front. The detected position information of the other vehicles is used for the control of the vehicle.

The image processing system of the invention photographs plural images while varying the exposure. Thereby, the system is able to detect lights with high precision by using an imaging device having a low dynamic range, and to thereby construct an inexpensive image processing system. Further, the system according to the invention is capable of reducing the influence of noise lights further more, which serves to advance the application that needs the vehicle detection at night by a camera.

BRIEF DESCRIPTION OF THE DRAWINGS

FIGS. 6A and 6B illustrate a technique relating to the embodiment 1, in which FIG. 6A illustrates the high intensity detection image for detecting the positions of the headlights, and FIG. 6B illustrates the low intensity detection image for detecting the positions of the tail lamps, the blooming area of which is masked in order to prevent the double detection of the high-intensity light spots;

FIGS. 7A and 7B illustrate a technique relating to the embodiment 1, in which FIG. 7A shows a high intensity detection image for detecting the positions of the headlights, and FIG. 7B shows a low intensity detection image for detecting the positions of the tail lamps;

FIGS. 10A and 10B illustrate a technique relating to the embodiment 2, in which FIG. 10A shows a high intensity detection image for detecting the positions of the headlights, and FIG. 10B shows a low intensity detection image for detecting the positions of the tail lamps;

FIGS. 11A and 11B illustrate a technique relating to the embodiment 2, in which FIG. 11A shows a high intensity detection image for detecting the positions of the headlights, and FIG. 1B shows a low intensity detection image for detecting the positions of the tail lamps;

FIGS. 12A to 12C illustrate how the tail lamps of a large-size vehicle and a red traffic light are photographed, in which FIG. 12A shows an image of a large-size vehicle in front, FIG. 12B shows an image of a red traffic light with double bases, and FIG. 12C shows an image to show how the former two images come out in the high intensity detection image;

DETAILED DESCRIPTION OF THE PREFERRED EMBODIMENTS

The embodiments of the invention will now be described with reference to the accompanying drawings.

Figure 1:
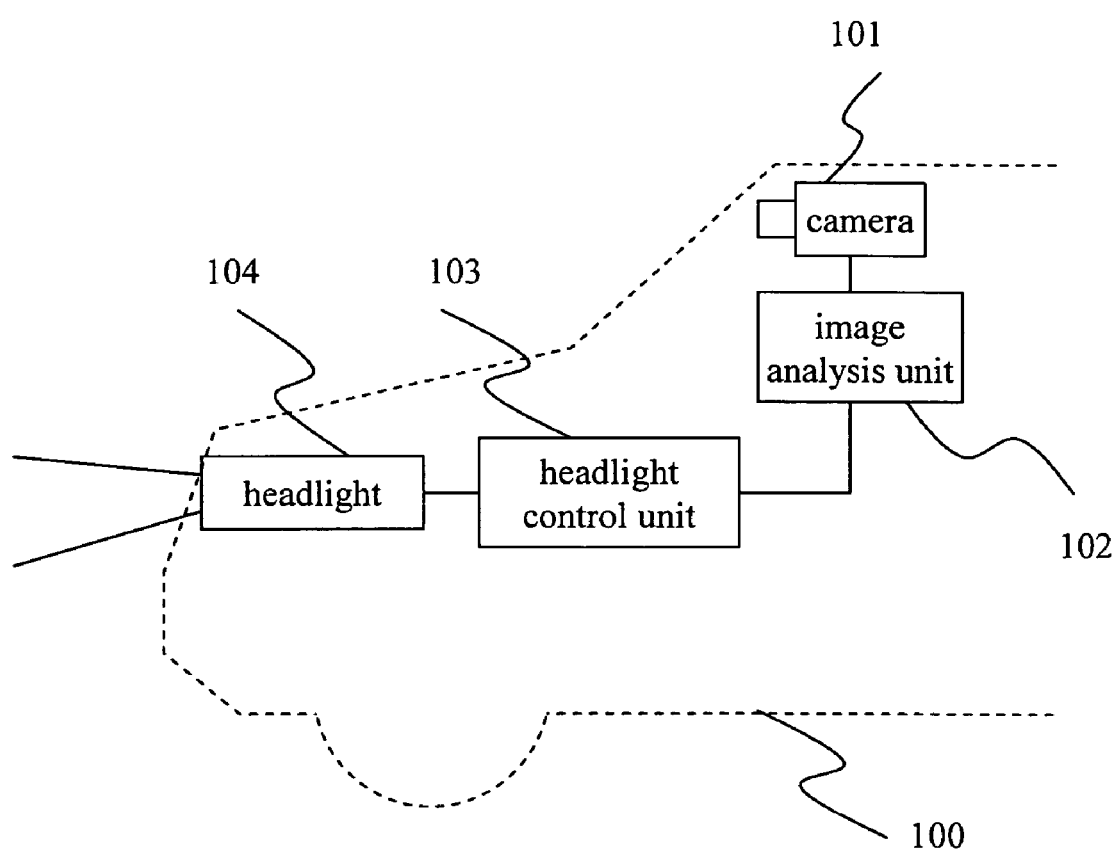
FIG. 1 illustrates a configuration of a headlight distribution control, according to the invention.

FIG. 1 typically illustrates a configuration of the image processing system that realizes the headlight distribution control. The image processing system is mounted on a vehicle 100 such as an automobile. The system of this embodiment includes a camera (imaging means) 101 and an image analysis unit 102. The camera 101 is installed near the room mirror (not illustrated) of the seat, so that it can photograph the images in front of the traveling vehicle 100. The images in front of the vehicle, photographed by the camera 101, are processed into image signals, which are inputted to the image analysis unit 102. The image analysis unit 102 analyzes the images transmitted from the camera 101, and calculates the distance to the other vehicle traveling in front of the vehicle 100. A headlight control unit 103 receives an output signal from the image analysis unit 102, and generates a control signal that controls a headlight 104 on the basis of the distance calculated by the image analysis unit 102. The control signal generated by the headlight control unit 103 is sent to the headlight 104. Concretely, the headlight control unit 103 calculates the voltages for the high beam and low beam of the headlight 104, and applies the calculated voltages to the headlight 104.

Here, the headlight control unit 103 may calculate the currents for the high beam and low beam of the headlight 104, and supply them to the headlight 104. Further, to move the filament or reflector (not illustrated) of the headlight 104, the headlight control unit 103 may send to the headlight 104 a signal for controlling the angle of the optical axis to which the headlight 104 irradiates. This control method makes it possible to vary the optical axis of the light that the headlight 104 irradiates, and to control the distance of irradiation from the headlight 104.

Figure 2:
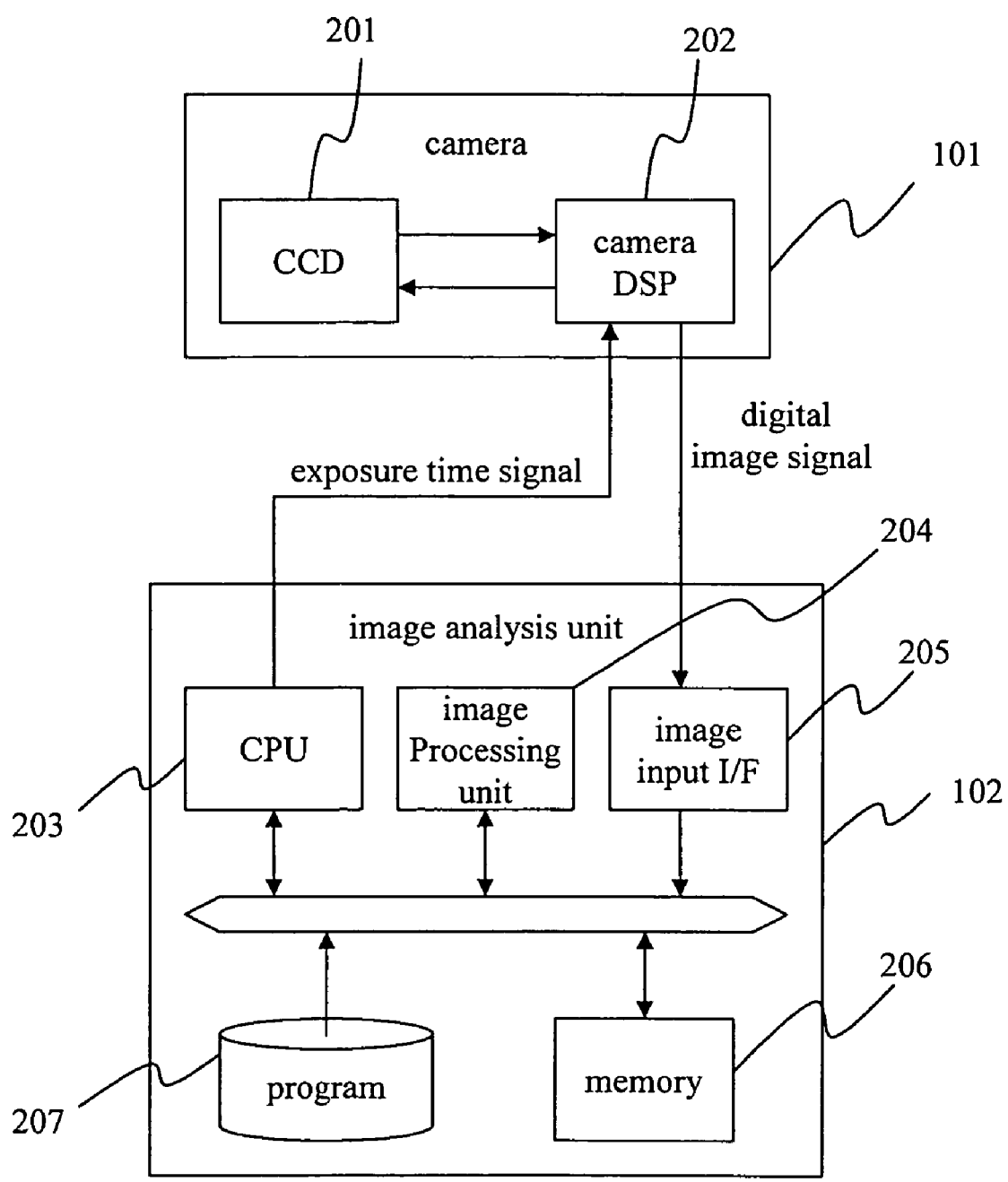
FIG. 2 illustrates configurations of a camera and an image analysis unit.
Figure 3:
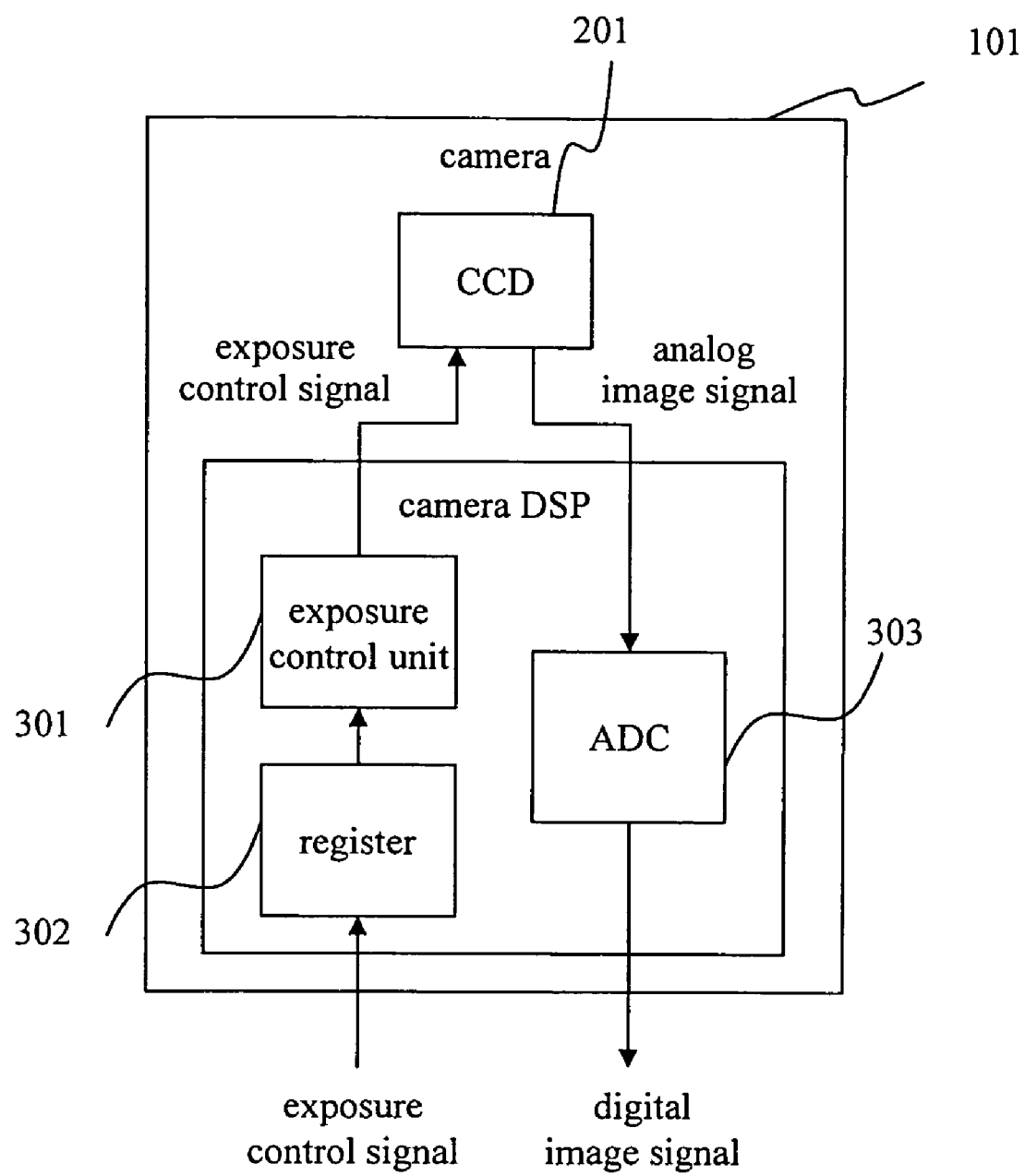
FIG. 3 illustrates a detailed configuration inside the camera.

FIG. 2 typically illustrates the internal configurations of the camera 101 and the image analysis unit 102. FIG. 3 illustrates the internal configuration of the camera 101 in detail. With reference to FIG. 2 and FIG. 3, the operations of the camera 101 and the image analysis unit 102 will be described.

The camera 101 includes a CCD 201 for detecting images and a camera DSP 202. The CCD 201 is an imaging device that converts light into electric charge. The imaging device converts an image in front of a vehicle into an analog image signal, and transfers the result to the camera DSP 202. The camera 101 may include a lens additionally, and a filter and so forth as needed.

The camera DSP 202 contains an ADC 303 (Analog-Digital Converter), an exposure control unit 301 for controlling the exposure, and a register 302 for setting the exposure time. The ADC 303 converts the analog image signal being the result that the CCD 201 detected and converted the images into a digital image signal, and sends the digital image signal to an image input I/F 205 of the image analysis unit 102. The digital image signal, which is continuously sent from the camera DSP 202, contains the synthesizing signal at the leading. Therefore, the image input I/F 205 can fetch only the digital image signal at a required timing. The digital image signal fetched by the image input I/F 205 is written in a memory 206, which is processed and analyzed by an image processing unit 204. The processing here will be detailed later. A program 207 written in a FROM executes a series of processing. A CPU 203 executes the controls and necessary calculations for making the image I/F 205 fetch the images, and making the image processing unit 204 process the images.

The CCD 201 photographs the images in front of the vehicle for the exposure time set to the register 302. A user can arbitrarily rewrite the exposure time set to the register 302. A rewritten exposure time is reflected on the photographing at the next frame or the next field and later.

The camera DSP 202 executes the control of the set exposure time. The camera DSP 202 controls the time during which the power of the CCD 201 is on, thereby controlling the amount of light irradiated on the CCD 201. This is called the electronic shutter method. The control of the exposure time can also be realized by the method of opening and closing the mechanical shutter, other than the electronic shutter method. Alternatively, the exposure may be varied by providing a diaphragm and controlling the diaphragm. Further, in scanning every one lines as seen in the interlaced scanning, the exposure in the odd line and the exposure in the even line may be varied.

Figure 4:
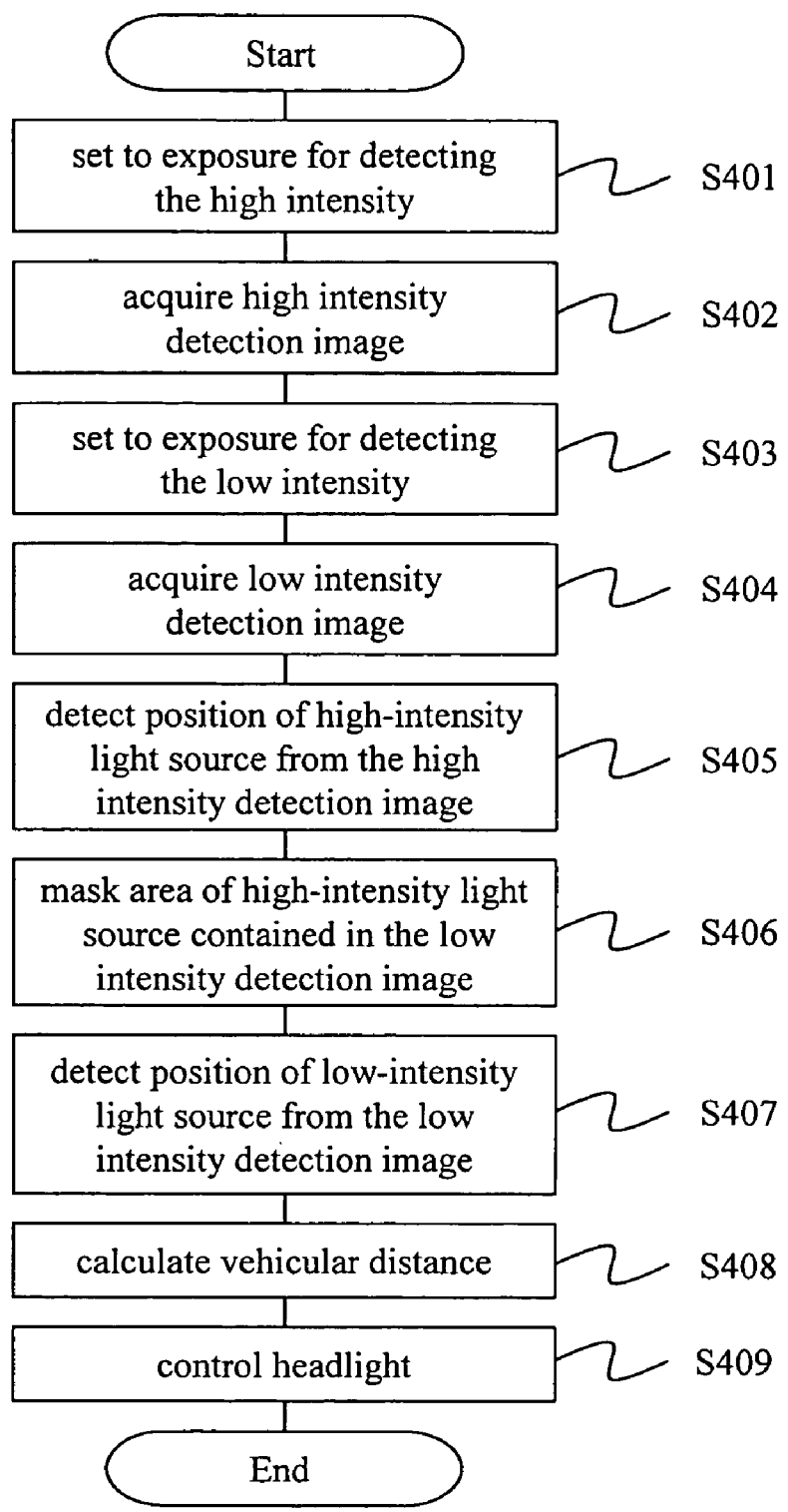
FIG. 4 illustrates a processing flow relating to the embodiment 1, which calculates a vehicular distance from the images with two different exposures.
Figure 5:
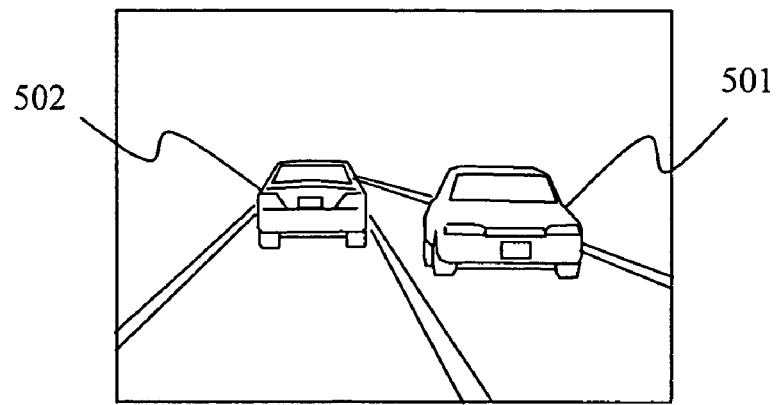
FIG. 5A illustrates a state in front of the vehicle relating to the embodiment 1, which finds a preceding vehicle and an opposing vehicle.
FIG. 5B shows an image of the state in FIG. 5A photographed with the exposure time for detecting the high intensity.
FIG. 5C shows an image of the state in FIG. 5A photographed with the exposure time for detecting the low intensity.
Figure 5:
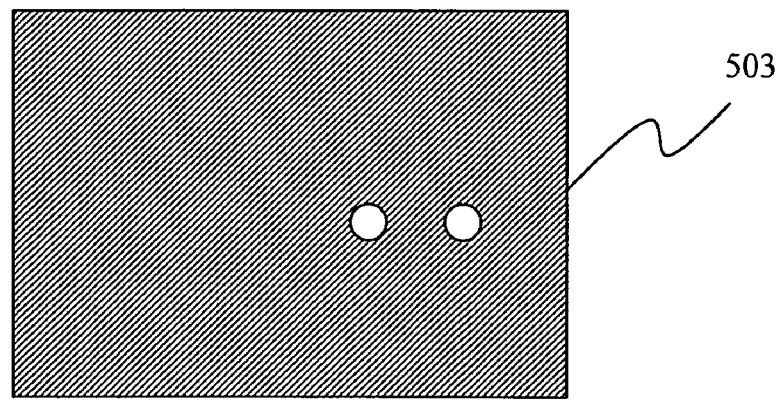
Figure 5:
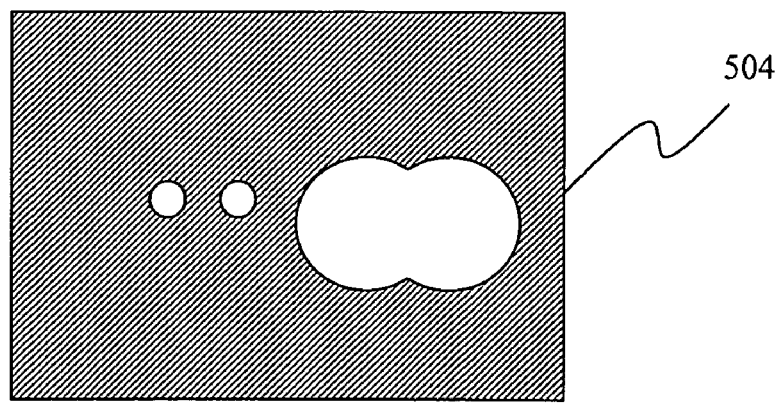
Figure 6:
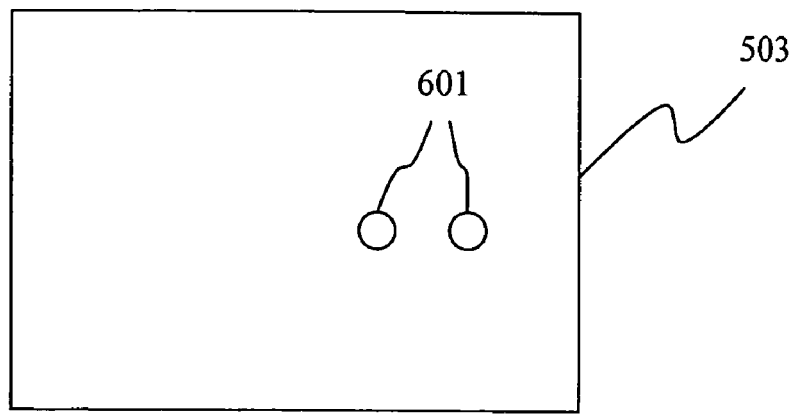
Figure 6:
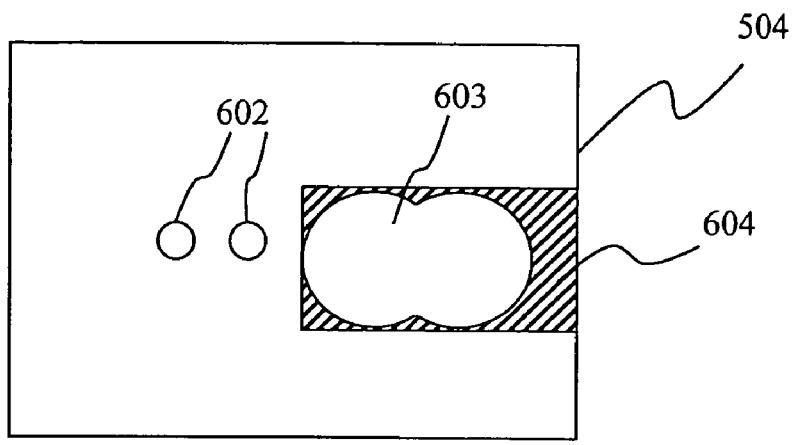
Figure 7:
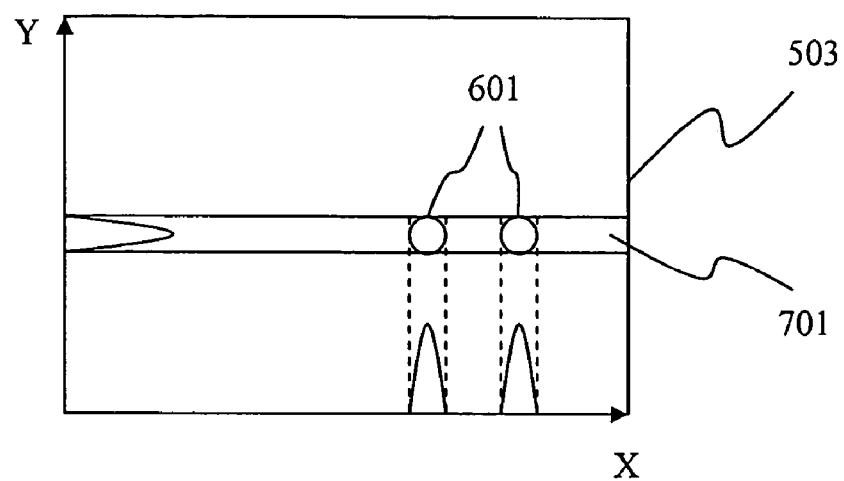
Figure 7:
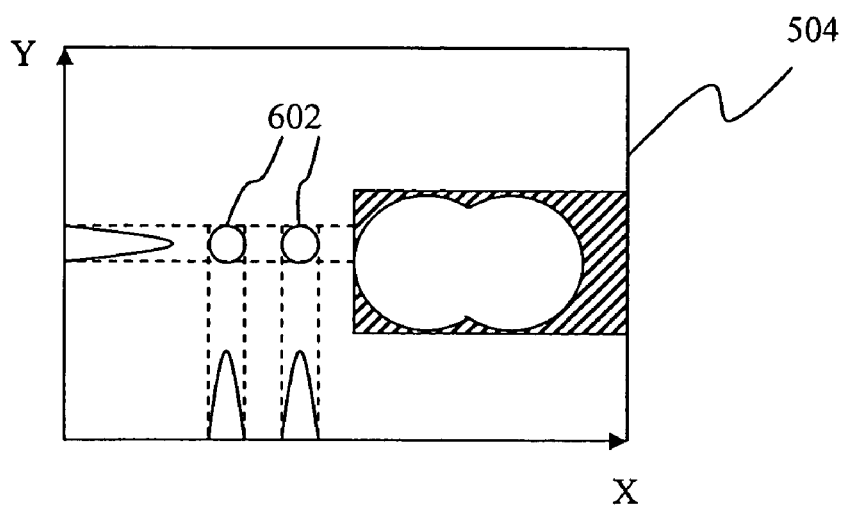

FIG. 4 is a flow chart illustrating the processing flow of the embodiment 1. The symbols S401 through S409 each show the step of each processing. First, the outline of each processing step will be explained.

S401 through S404 acquire the high intensity detection image and the low intensity detection image, and transfer them to the image analysis unit 102. The transferred image data contain the synthesizing signals, and the CPU 203 executes the processing related to the image input/output with the synthesizing signals as the interrupt timings.

S405 through S407 detect the positions of the light spots in the images from the image data, using the image analysis unit 102.

S408 calculates the vehicular distance between the own vehicle and the other vehicle traveling in front. S409 calculates the target voltage applied to the headlight 104 on the basis of the vehicular distance to the nearest other vehicle, and the headlight control unit 103 controls the voltage applied to the headlight 104.

Next, each processing step will be explained in detail with FIG. 4 through FIGS. 7A to 7B.

At S401, the CPU 203 sets the register 302 to the exposure for detecting the high intensity. In detail, the step sets the optimum exposure time for detecting the high-intensity light spots. The optimum exposure time is selected to detect the light spots of the headlights of the opposing vehicle in front, or the light spots of the tail lamps of the preceding vehicle traveling in a comparably close range. The exposure time for detecting the high-intensity light spots is about $1/120$ sec to $1/250$ sec, which depends on the sensitivity characteristic of the CCD 201 being the imaging device.

FIGS. 5A to 5C are typical illustrations of the image in front of the vehicle 100, photographed by the camera 101. FIG. 5A illustrates the image in front of the vehicle 100 traveling on the road, which finds an opposing vehicle 501 and a preceding vehicle 502. Photographing the state of FIG. 5A with the exposure time for detecting the high intensity, the step acquires a high intensity detection image 503, as illustrated in FIG. 5B. Since the intensity of the headlights of the opposing vehicle 501 is high, the headlights come out as light spots in the high intensity detection image 503. However, the intensity of the tail lamps of the preceding vehicle 502 is low, and the tail lamps do not come out in the high intensity detection image 503.

At S402, the image input I/F 205 of the image analysis unit 102 receives the digital image signal by the exposure time set at S401, and then stores it in the memory 206.

At S403, the CPU 203 rewrites the register 302 to the exposure for detecting the low intensity. This is the optimum exposure time for detecting the low-intensity light spots, which is selected to detect the light spots of the tail lamps traveling in a comparably distant range. The exposure time for that becomes longer than the time set at S401, which is about $1/30$ sec to $1/60$ sec. Photographing the state of FIG. 5A with the exposure time for detecting the low intensity, the step acquires a low intensity detection image 504, as illustrated in FIG. 5C. The low intensity detection image 504 can capture the low-intensity light spots of the tail lamps of the preceding vehicle 502. However, since the intensity of the headlights of the opposing vehicle 501 is high, the high intensity creates the blooming in the image 504, thus saturating the surrounding pixels into being white.

At S404, in the same manner as S402, the image input I/F 205 receives the digital image signal by the exposure time set at S403, and stores it in the memory 206.

S405 through S407 analyze the image taken by the camera 101, and calculate the positions of the light spots. The processing at S405 through S407 is executed by the CPU 203 and the image processing unit 204. A series of processing at S405 through S407 will be explained with FIGS. 6A to 6B and FIGS. 7A to 7B.

S405 detects the position of high-intensity light spots 601 illustrated in FIG. 6A, using the high intensity detection image 503. The method of detecting the position of the light spots will be explained later. After detecting the position of the high-intensity light spots 601, S406 and S407 detect the position of low-intensity light spots, using the low intensity detection image 504 illustrated in FIG. 6B. Here, the low intensity detection image 504 contains the high-intensity light spots, which can create the blooming as mentioned above. However, a blooming area 603 including the position of the high-intensity light spots 601 is already detected in the high intensity detection image 503.

Accordingly, S406 masks the blooming area 603 in order to prevent the double detection of the high-intensity light spots in the low intensity detection image 504. Here, in case the vehicle such as automobile is regulated to keep the left-hand traffic as on the Japanese roads, an opposing vehicle is located right on the image screen; therefore, it is almost impossible that the tail lamps of a preceding vehicle are located righter on the image screen than the headlights of the opposing vehicle. Accordingly, a masking area 604 is set to the whole right area from the blooming area 603, as shown in FIG. 6B. In case the vehicle such as automobile is regulated to keep the right-hand traffic, on the contrary, the whole left area from the blooming area is to be masked.

S407 detects the position of low-intensity light spots 602 in the area except for the masking area 604.

Next, the method of detecting the positions of the high-intensity light spots and low-intensity light spots will be explained with FIGS. 7A and 7B. Here, FIG. 7A illustrates the high intensity detection image 503, and FIG. 7B illustrates the low intensity detection image 504. The light spots beam with a high intensity, and has a high concentration on the image; accordingly, they come out white. The concentration is given with 8 bits, that is, it is expressed with 256 phases of 0 to 255. The concentration near the high-intensity light spots is close to 255, and that of the area except for the former is close to 0. Accordingly, to detect the position of the high-intensity light spots, the method, accumulating all the concentrations of the pixels having the same Y coordinate, projects them on the Y axis, as shown in FIG. 7A. This projected distribution is named the Y-axis concentration projected distribution. As shown in FIG. 7A, there appears one mountain for one vehicle on the Y coordinate axis in the Y-axis concentration projected distribution. Calculating the peak of the mountain will acquire the Y coordinate of the light spots. Further, by limiting the Y-axis concentration projected distribution to the light spots existing band 701 with the skirts of the mountain detected by the Y-axis concentration projected distribution as the upper end and the lower end, the method calculates the X-axis concentration projected distribution. Generally, the vehicle such as automobile has two headlights on the right and left, and there appear two mountains on the X coordinate axis. However, in case of the road having plural lanes on one side, two or more vehicles can travel in parallel, and there can appear two or more mountains. In case the vehicle is the two-wheeler such as a motorcycle, it has one headlight; accordingly, there appears one mountain on the X coordinate axis. In case of the low-intensity light spots, in the same manner as the high-intensity light spots, the positions on the coordinate axes can be calculated. In the area excluding the masking area 604, as shown in FIG. 7B, the Y-axis concentration projected distribution is calculated in the same manner as the case in FIG. 7A, and the X-axis concentration projected distribution is calculated in the band area.

In case of a four-wheeler such as an automobile, it has two tail lamps and two headlights as the light spots, and two light spots need to be detected. However, there is a vehicle with four tail lamps, and even if there is one preceding vehicle, there can be four mountains in the X-axis concentration projected distribution. In such a case, it is difficult to deteemine whether the preceding vehicle is one or two. Accordingly, in the vehicle with four tail lamps as mentioned above, when there appeared four or more mountains, the embodiment of this invention, utilizing that the tail lamps are bilaterally symmetrical to the center line of the vehicle, analyzes the widths of the mountains on the X axis and the positions thereof on the X axis. This analysis result will give the determination whether there is one preceding vehicle with four tail lamps or there are two preceding vehicles with two tail lamps.

After detecting the positions of the low-intensity and high-intensity light spots, S408 (in FIG. 4) calculates the vehicular distance. If the opposing vehicle or the preceding vehicle is a four-wheeler, the width of the vehicle can be calculated from the headlights or the tail lamps. In this case, the angle of view of the headlights or the tail lamps is measured with the camera 101. The information of the angle of view and the theory of triangulation will give the vehicular distance between the own vehicle and the opposing vehicle or preceding vehicle. However, when the opposing vehicle or the preceding vehicle is a two-wheeler, there is only one lamp, and it is impossible to calculate the width of vehicle by the above method. Now, in case of one light spot as a two-wheeler, the measurement of distance by the depression angle is made by utilizing the height of the camera installed on the own vehicle from the road surface. That is, by utilizing that the height of the camera installed on the own vehicle is higher than the height of the lamp of the two-wheeler from the road surface, and using the triangulation, the vehicular distance measurement can be made. In case the opposing vehicle or the preceding vehicle is a four-wheeler, there are some vehicles, for example, buses, or motor trucks having the tail lamps or the headlights at a higher position than the height of the camera installed on the own vehicle from the road surface. In such a case, the vehicular distance measurement by the depression angle is impossible. Therefore, the vehicular distance measurement using the lamp spacing information is carried out.

Figure 16:
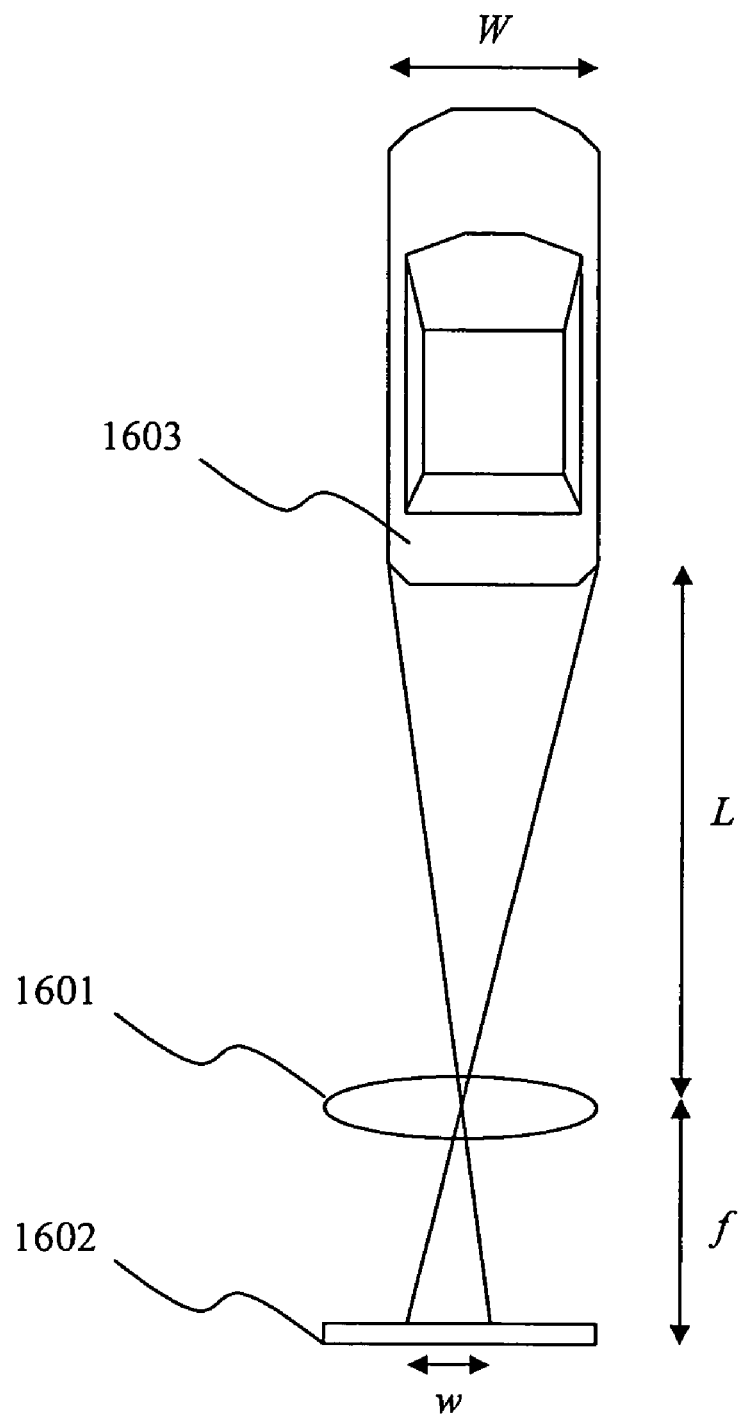
FIG. 16 illustrates a method of calculating a vehicular distance from the width of a vehicle, based on the triangulation theory.
Figure 17:
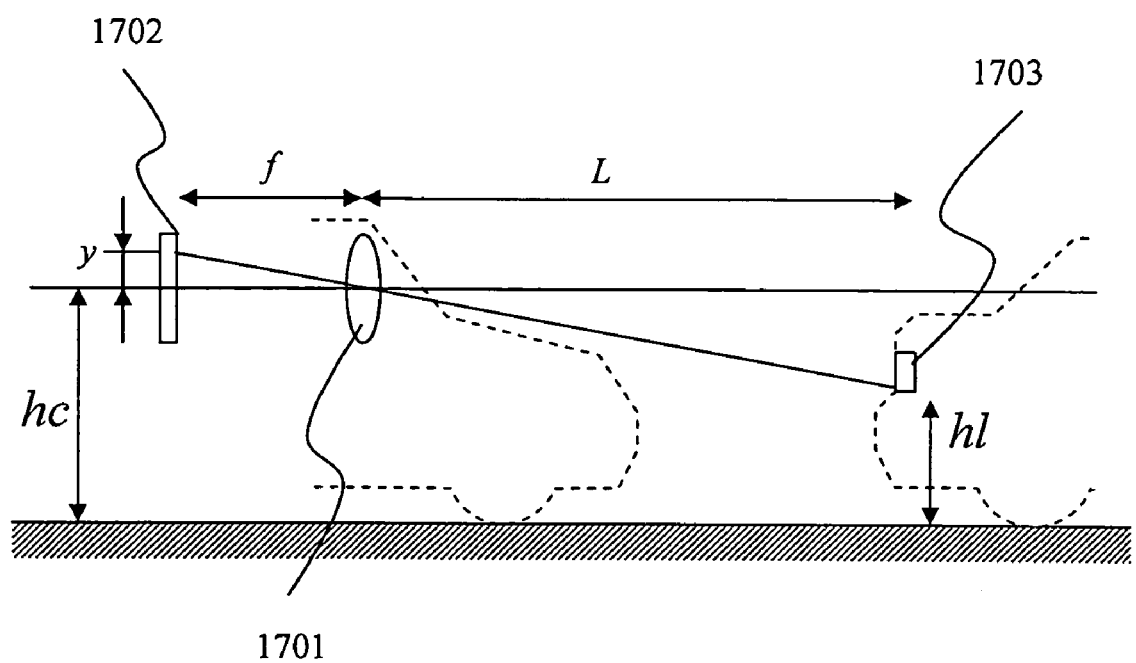
FIG. 17 illustrates a method of calculating a vehicular distance from the information of a depression angle, based on the triangulation theory.

The method of calculating the vehicular distance by means of the triangulation will be explained with FIG. 16 and FIG. 17. First, in calculating the distance from the information of the vehicular width, the measurement is made based on the principle shown in FIG. 16. Assuming that the actual vehicular width W of a preceding vehicle 1603, the focal length f of the camera, and the vehicular width w of the image photographed on the face of the CCD 1602 are given, the distance L to the preceding vehicle 1603 from the camera is expressed as:

$L = Wf/w$

Here, the actual vehicular width W is unknown, and if it is presumed 1.7 m as the average, the distance can be calculated.

Next, the method of calculating the distance using the depression angle will be explained with FIG. 17. Assuming that the height hl of the tail lamp 1703 of the preceding vehicle from the road surface, the focal length f of the camera, and the coordinate y of the image photographed on the face of the CCD 1702 are given, the distance L to the preceding vehicle from the camera is expressed as:

$L = (hc-hl) \times f/y$

Here, the actual height hl of the tail lamp 1703 of the preceding vehicle from the road surface is unknown, and it is necessary to presume it as 80 cm, for example. However, this value greatly varies depending on the individual difference of the vehicle. Especially, when the height hl is higher than the optical axis of the camera, namely, the height hc of the camera from the road surface is lower than the height hl of the tail lamp from the road surface, it will not give the distance. Therefore, the use of this method should be confined to the two-wheeler, and it is advisable to calculate the distance using the vehicular width as the method shown in FIG. 16.

Now, when even a four-wheeler is far from the own vehicle, the two right and left light spots of the headlights or the tail lamps cannot be distinguished due to the image definition and the like. For example, assuming that the vehicular width of a four-wheeler is 1.7 m, when using the camera of which angle of view of the lens is 28°, horizontal definition is 640, lateral size of the CCD is 5 mm, and focal length is 10 mm, the vehicular width at 300 m far corresponds to about 7 pixels. Here, the right and left two light spots cannot be distinguished, and the distance measurement by the lamp spacing is switched to the distance measurement by the depression angle. Here, the matching of the distance cannot be maintained, and as a result, the distance can vary apparently sharply. That is, since the two distance measurement methods are different, the error will exert adverse effect. As for this problem, calculating the vehicular distance of a four-wheeler by the two types of distance measurement methods, and adopting the shorter distance of the two will relieve the adverse effect due to the error.

S409 in FIG. 4 executes the light distribution control of the headlights based on the most approximate value of the vehicular distances acquired at S408. The CPU 203 calculates the voltages for the low beam and the high beam of the headlights from the value of the shortest vehicular distance, and sends the calculated data to the headlight control unit 103. The headlight control unit 103 applies the voltages based on the received data to the filaments for the low beam and the high beam of the headlights. Here, when the vehicular distance to the nearest vehicle is less than 80 m, the headlight control unit 103 applies the voltages only to the filaments for the low beam. As the vehicular distance becomes widened, while gradually decreasing the voltage for the low beam, the headlight control unit 103 increases the voltage for the high beam. When the vehicular distance is more than 400 m, the headlight control unit 103 applies the voltages only to the filaments for the high beam.

Figure 8:
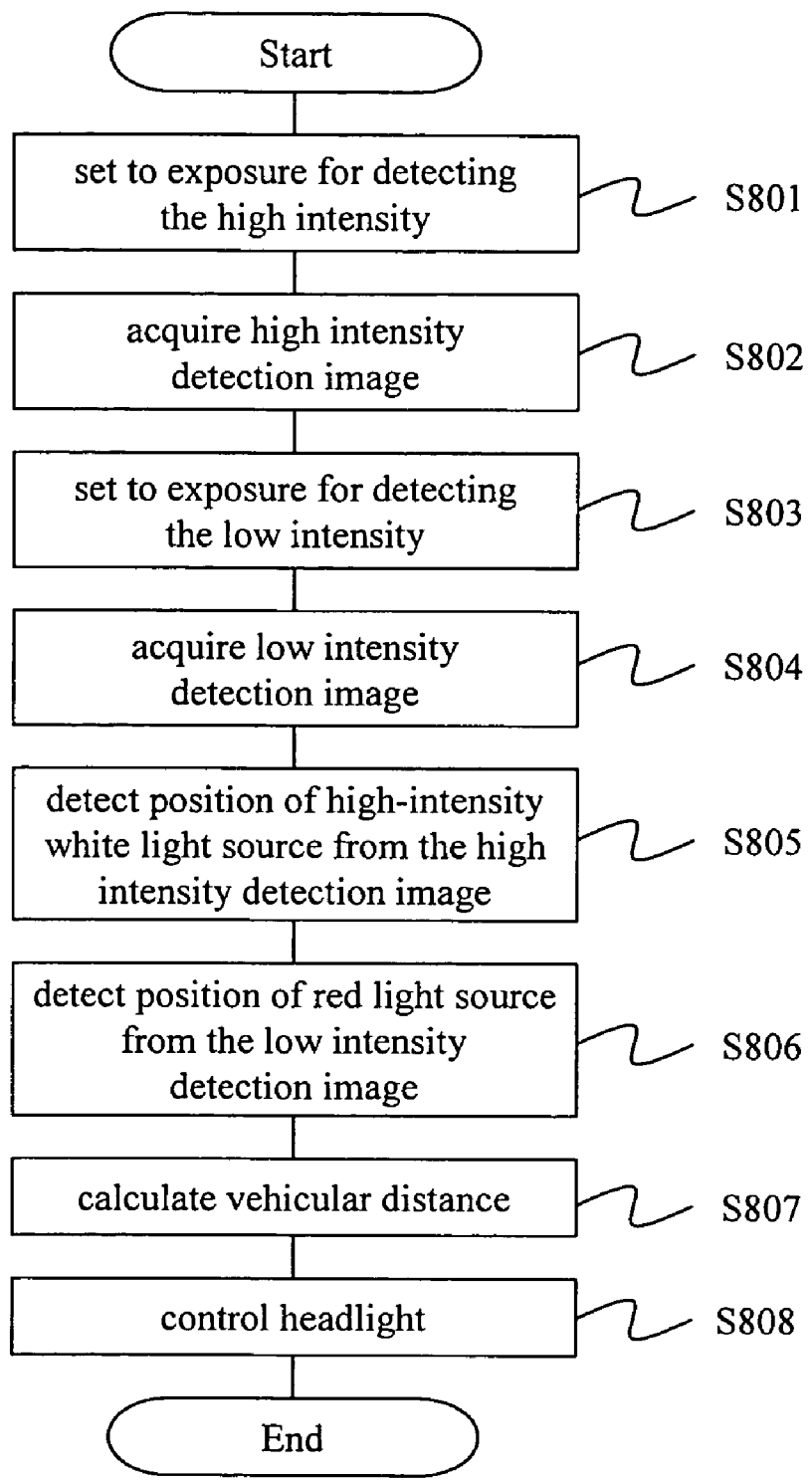
FIG. 8 illustrates a processing flow relating to the embodiment 2, which calculates a vehicular distance from the images with two different exposures.
Figure 9:
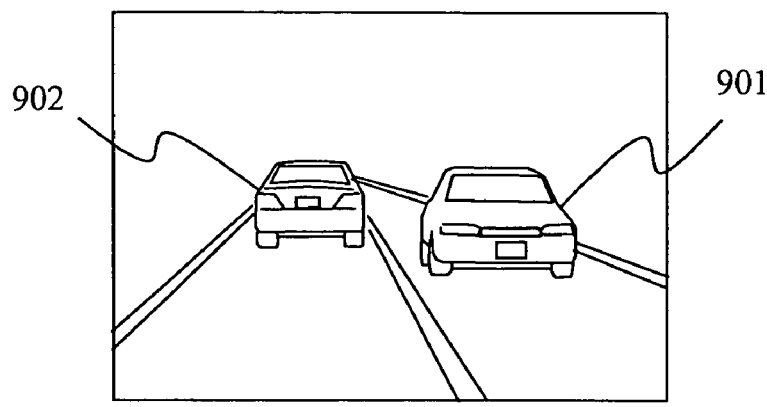
FIG. 9A illustrates a state in front of the vehicle relating to the embodiment 2, which finds a preceding vehicle and an opposing vehicle.
FIG. 9B shows an image of the state in FIG. 9A photographed with the exposure time for detecting the high intensity.
FIG. 9C shows an image of the state in FIG. 9A photographed with the exposure time for detecting the low intensity.
Figure 9:
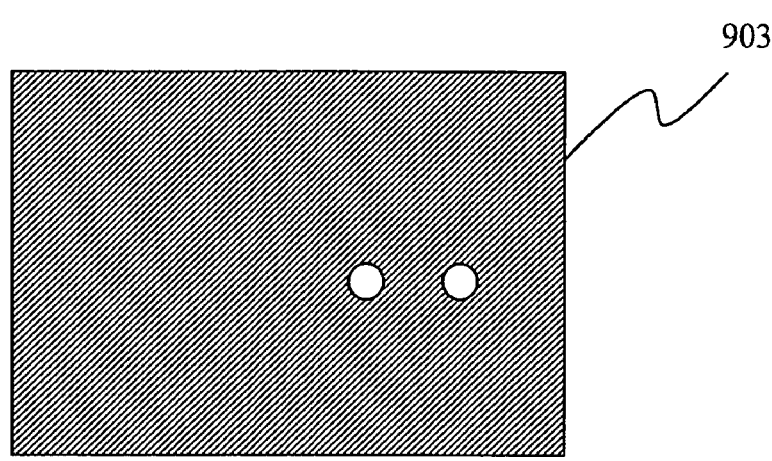
Figure 9:
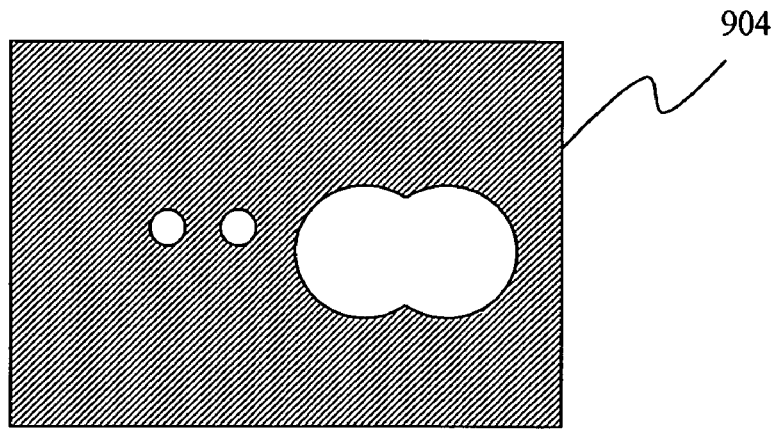
Figure 10:
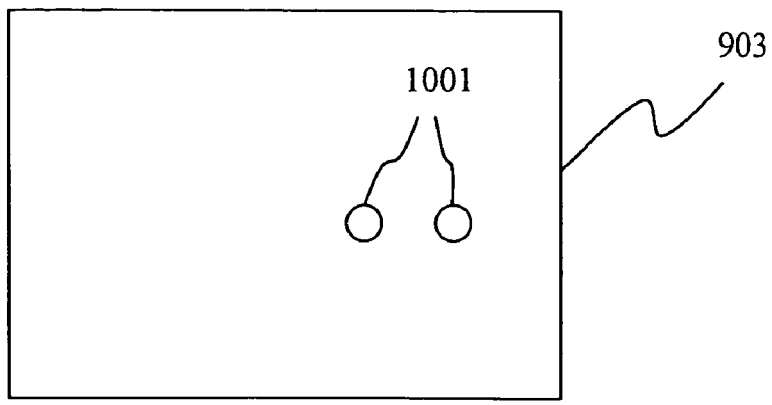
Figure 10:
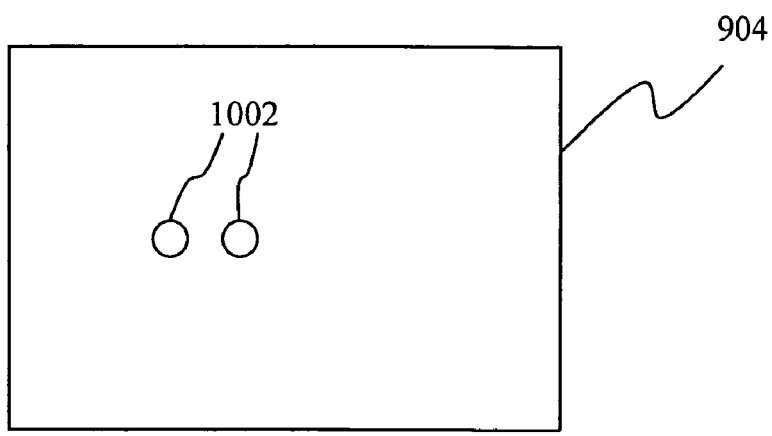
Figure 11:
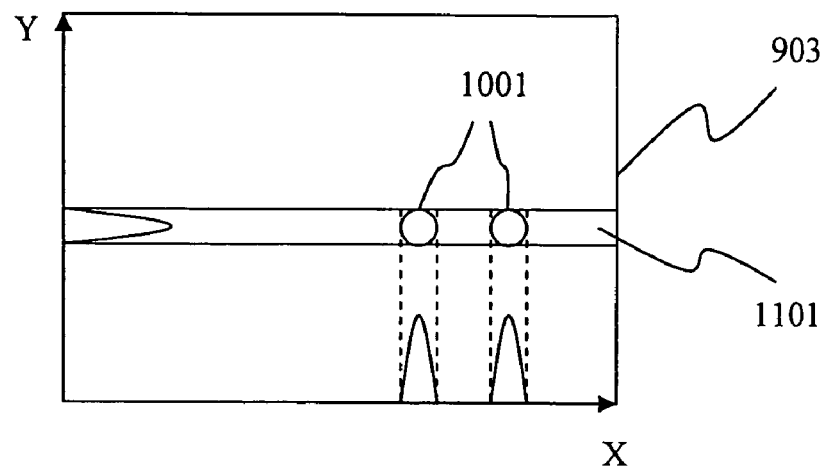
Figure 11:
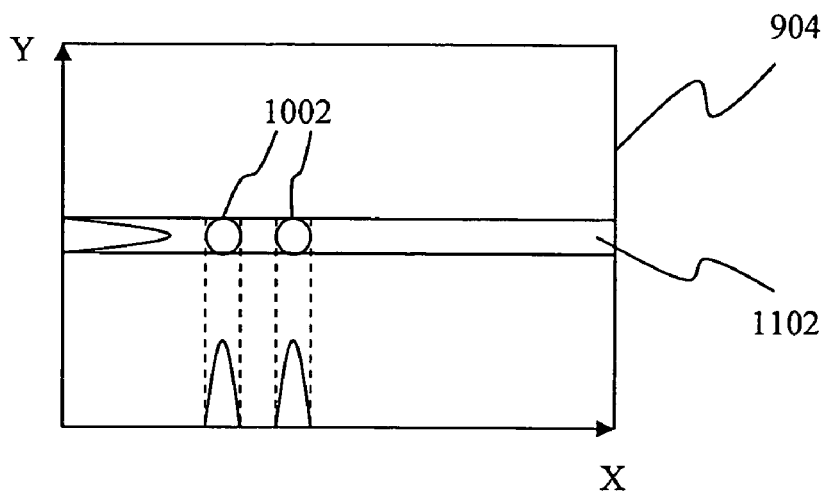

Next, the embodiment 2 will be described. The embodiment 2 uses a color CCD in the CCD 201 being the imaging device. FIG. 8 is a flow chart illustrating the processing flow of the embodiment 2 that uses a color camera. S801 through S809 each show the step of each processing. First, the outline of each processing step will be explained.

S801 through S804 acquire the high intensity detection image and the low intensity detection image, and transfer them to the image analysis unit 102. The transferred image data contain the synthesizing signals, and the CPU 203 executes the processing related to the image input/output with the synthesizing signals as the interrupt timings. S805 and S806 detect the positions of the light spots in the images from the image data, using the image analysis unit 102. S807 calculates the vehicular distance between the own vehicle and the other vehicle traveling in front. S808 calculates the target voltage applied to the headlight 104 on the basis of the vehicular distance to the nearest other vehicle, and the headlight control unit 103 controls the voltage applied to the headlight 104.

Next, each processing step will be explained in detail with FIG. 8 through FIGS. 11A and 11B.

At S801, the CPU 203 sets the register 302 to the exposure for detecting the high intensity. In the same manner as the embodiment 1, the step sets the optimum exposure time for detecting the high-intensity light spots. The optimum exposure time is selected to detect the light spots of the headlights of the opposing vehicle in front, or the light spots of the tail lamps of the preceding vehicle traveling in a comparably close range. The exposure time for detecting the high-intensity light spots is about $1/120$ sec to $1/250$ sec, which depends on the sensitivity characteristic of the CCD 201 being the imaging device.

FIGS. 9A to 9C are typical illustrations of the image in front of the vehicle 100, photographed by the camera 101. FIG. 9A illustrates the image in front of the vehicle 100 traveling on the road, which finds an opposing vehicle 901 and a preceding vehicle 902. Photographing the state of FIG. 9A with the exposure time for detecting the high intensity, the step acquires a high intensity detection image 903, as illustrated in FIG. 9B. Since the intensity of the headlights of the opposing vehicle 901 is high, the headlights come out as light spots in the high intensity detection image 903. However, the intensity of the tail lamps of the preceding vehicle 902 is low, and the tail lamps do not come out in the high intensity detection image 903.

At S802, the image input I/F 205 of the image analysis unit 102 receives the digital image signal by the exposure time set at S801, and then stores it in the memory 206.

At S803, the CPU 203 rewrites the register 302 to the exposure for detecting the low intensity. This is the optimum exposure time for detecting the low-intensity light spots, which is selected to detect the light spots of the tail lamps traveling in a comparably distant range. The exposure time for that becomes longer than the time set at S801, which is about $1/30$ sec to $1/60$ sec. Photographing the state of FIG. 9A with the exposure time for detecting the low intensity, the step acquires a low intensity detection image 904, as illustrated in FIG. 9C. The low intensity detection image 904 can capture the low-intensity light spots of the tail lamps of the preceding vehicle 902. However, since the intensity of the headlights of the opposing vehicle 901 is high, the high intensity creates the blooming in the image 904 in the same manner as the embodiment 1, thus saturating the surrounding pixels into being white.

At S804, in the same manner as S802, the image input I/F 205 receives the digital image signal by the exposure time set at S803, and stores it in the memory 206.

S805 and S806 analyze the image taken by the camera 101, and calculate the positions of the light spots. The processing at S805 and S806 is executed by the CPU 203 and the image processing unit 204. A series of processing at S805 and S806 will be explained with FIGS. 10A to 10B and FIGS. 11A to 11B.

S805 detects the position of high-intensity light spots 1001 illustrated in FIG. 10A, using the high intensity detection image 903. The method of detecting the position of the light spots will be explained later. After detecting the position of the high-intensity light spots 1001, S806 detects the position of low-intensity light spots, using the low intensity detection image 904 illustrated in FIG. 9C. Here, the low intensity detection image 904 contains the high-intensity light spots, which can create the blooming as mentioned above. Here, the embodiment 2 can use the color information, which is different from the embodiment 1. Therefore, it is possible to extract only the red color segments from the color of the tail lamps in the low intensity detection image 904.

Next, the method of detecting the positions of the high-intensity light spots and low-intensity light spots will be explained with FIGS. 11A and 11B. Here, FIG. 11A illustrates the high intensity detection image 903, and FIG. 11B illustrates the low intensity detection image 904. The light spots beam with a high intensity, and has a high concentration on the image; accordingly, they come out white. The concentration is given with 8 bits, that is, it is expressed with 256 phases of 0 to 255. The concentration near the high-intensity light spots is close to 255, and that of the area except for the former is close to 0. Accordingly, to detect the position of the high-intensity light spots, the method, accumulating all the concentrations of the pixels having the same Y coordinate, projects them on the Y axis, as shown in FIG. 11A. This projected distribution is named the Y-axis concentration projected distribution. As shown in FIG. 11A, there appears one mountain for one vehicle on the Y coordinate axis in the Y-axis concentration projected distribution. Calculating the peak of the mountain will acquire the Y coordinate of the light spots. Further, by limiting the Y-axis concentration projected distribution to the light spots existing band 1101 with the skirts of the mountain detected by the Y-axis concentration projected distribution as the upper end and the lower end, the method calculates the X-axis concentration projected distribution.

In case of the low-intensity light spots, the position on the coordinate axis can be detected in the same manner as the high-intensity light spots. There are various standards of colorimetric systems with regard to the color image. This embodiment can be implemented with any colorimetric system, but it will be described with the general YUV calorimetric system. The YUV image is composed of the two images, namely, the Y image corresponding to the concentration information, and the UV image having the color information. The UV image displays the two-dimensional color map, from which can be extracted the hue and chroma information being the basic information of color. That is, to process the YUV color image will make it possible to extract only the red color segments. Utilizing this feature, this embodiment 1 extracts only the high-intensity segments having the red color components from the whole area in the low intensity detection image 904, which is completely different from the embodiment 1 that extracts the high-intensity segments from the masked image.

FIG. 10B shows the high-intensity segments having the red color components. That is, to extract only the high-intensity segments having the red color components will make it possible to save the masking process, and to extract only the area of the tail lamps. The method of detecting the light spots is the same as that in FIG. 11A, which calculates the Y-axis concentration projected distribution, and the X-axis projected distribution in the band area.

The processing at S807 and S808 are equivalent to those at S408 and S409, and the explanations will be omitted.

The method of discriminating various light sources except for the vehicles on the roads at night will now be described. Many light sources except for the vehicles are apt to behave as noises in the image processing system. Therefore, in the image processing system, the lights sources captured by the camera 101 have to be discriminated into the lamps of the vehicle and other noise light sources. Hereunder will be explained the method of eliminating the noise light sources in case of using a color camera as the camera 101.

The noise light source being the nearest to the road and bright is a reflector installed on the side of the road. The reflector is a device to reflect the headlights of the own vehicle. When the reflector is installed near, the intensity thereof can be higher than that of the tail lamps of the preceding vehicle. Although the reflector comes out rarely in the high intensity detection image 903, it comes out with a high probability in the low intensity detection image 904.

This problem can be solved with the color information. Generally, the reflector installed on the left of the road reflects white, and the reflector installed on the right of the road reflects orange. Therefore, in detecting the light spots from the low intensity detection image 904, the method extracts the red light spots, namely, the read area only, and excludes all the other colors except for the read of the low-intensity light spots.

Figure 12:
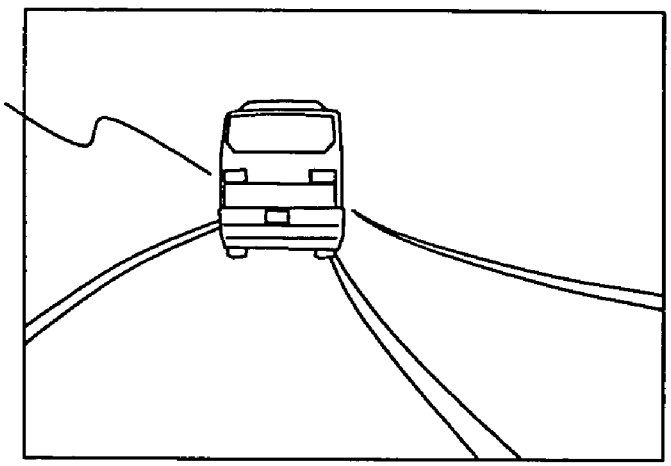
Figure 12:
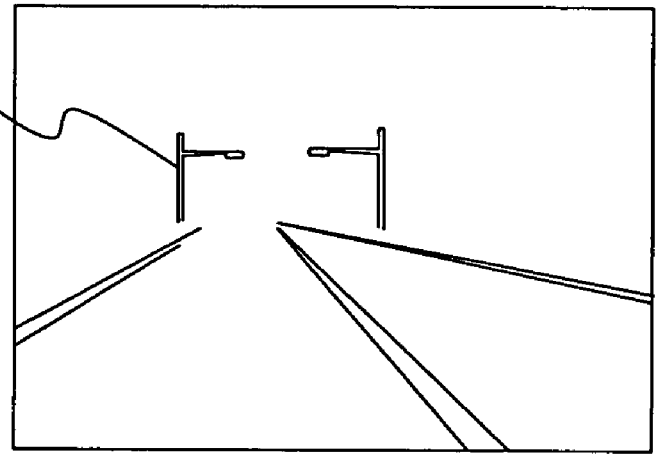
Figure 12:
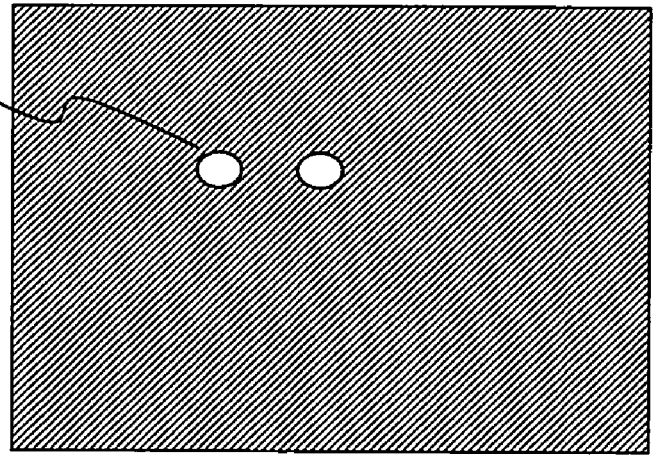

The traffic light is another problem. The traffic light is installed with double bases arrayed in parallel in order to secure the visibility, as shown in FIG. 12B. Therefore, it is possible to confuse a double base traffic light 1202 located at 400 m to 500 m distant with tail lamps 1201 of a bus, for example, traveling about 100 m in front, which is installed at a comparably high position. This is because both the traffic light 1202 and the tail lamps 1201 of a bus come out in the same manner as light spots 1203 in FIG. 12C, when photographed by the camera. The intensity of the traffic light is generally high, and the traffic light comes out in the high intensity detection image 903. Accordingly, in case of the blue signal and the yellow signal, the method, using the color information, excludes the blue or yellow high-intensity light spots contained in the high intensity detection image 903.

It is conceivable to implant a red filter in the CCD 201. This method is able to reduce the intensity of the other noise light sources without lowering the quantity of light of the low-intensity tail lamps.

In general, the above methods will exclude most of the noise light sources. However, to exclude the noise light sources as much as possible will lead to ensuring a stable operation of the application. Therefore, it is preferable to assemble several methods and incorporate as many means to eliminate the noise light sources as possible. Hereunder, the method of eliminating the noise light sources, which is the present invention, will be described in detail.

Figure 18:
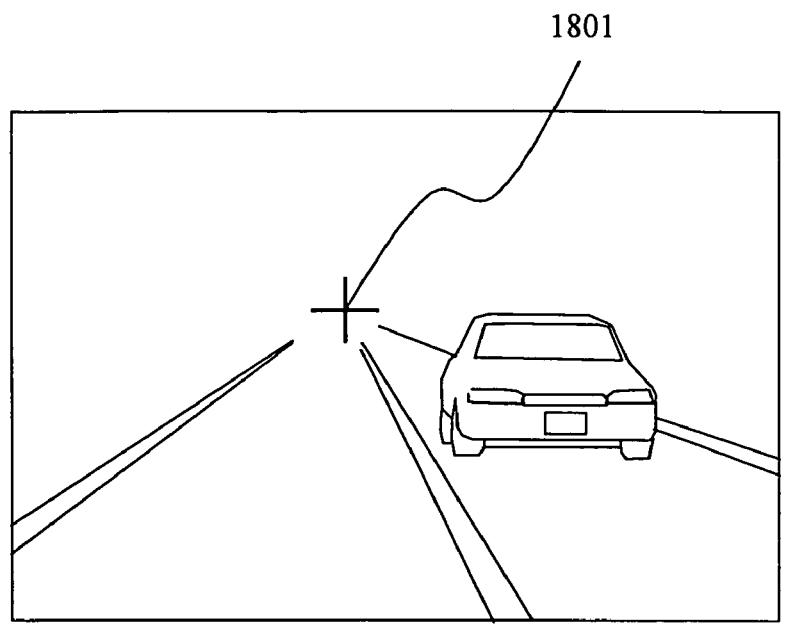
FIG. 18 illustrates a vanishing point on the screen.

First, the method of eliminating the red signal will be explained. In case of the red signal, even if it is excluded by means of the high intensity detection image 903, the red signal will come out in the low intensity detection image 904 as the red light spots. Therefore, the red signal is misidentified as the tail lamps basically. The misidentification of the red signal results from that the double base traffic light located distantly at 400 m to 500 m is confused with tail lamps of a bus or the like traveling about 100 m in front, installed at a comparably high position. Here, 'a comparably high position' means a position higher than a vanishing point 1801 in concrete. The vanishing point is a point that all the lane marks converge on, as illustrated in FIG. 18, to which the optical axis of the camera points. The tail lamps of a bus or the like installed at a higher position than the height of the camera installed on the own vehicle come out at a higher position than the vanishing point in the same manner as the traffic light; therefore, the discrimination of both becomes difficult. However, when the difference of a bus from the traffic light can be detected, the discrimination becomes possible.

Figure 13:
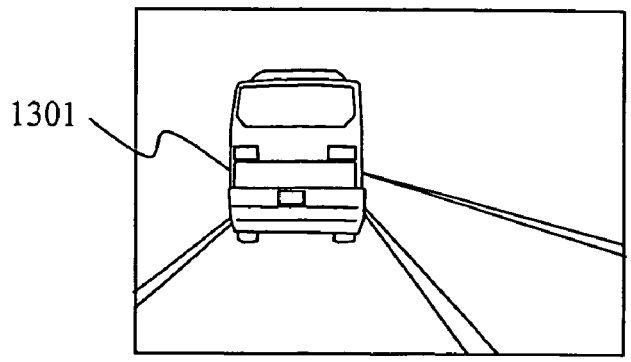
FIG. 13A shows an image of a large-size vehicle in a close range.
FIG. 13B shows a schematic layout of the tail lamps 1302, number plate lamp 1303, and passenger room light 1304 of the large-size vehicle that comes out in the low intensity detection image 1305.
FIG. 13C shows a state in which a far traffic light 1306 turns to the red signal, and there are opposing vehicles, and FIG. 13D show an image of the red traffic light with double bases 1308, headlamps 1309, and headlamps 1310.
Figure 13:
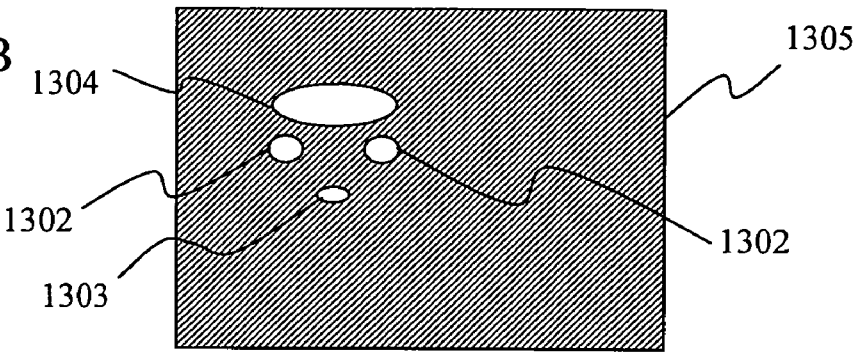
Figure 13:
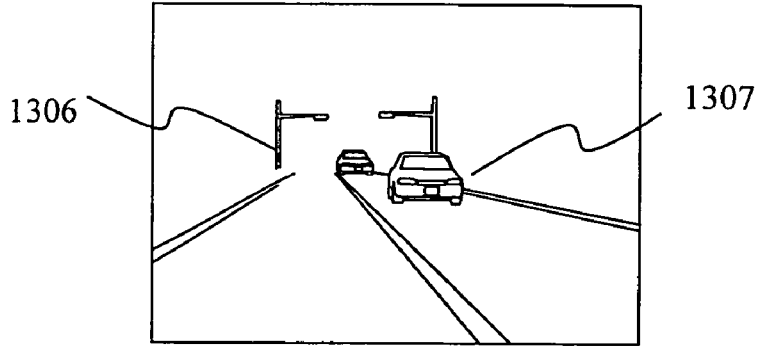
Figure 13:
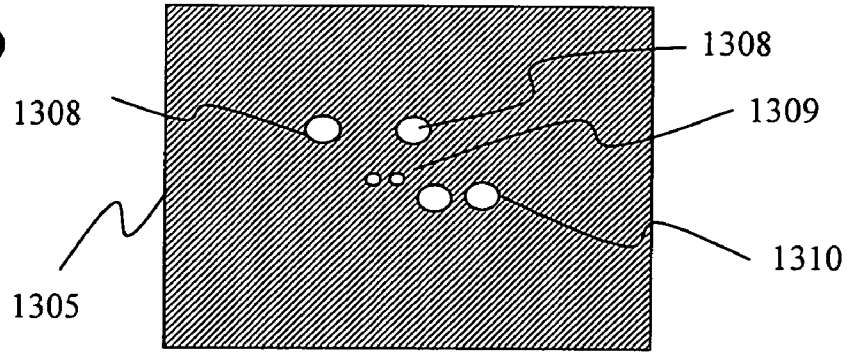

As shown in FIG. 13A, for example, if there is a bus 1301 traveling within 100 m comparably near, a number plate light 1303 under tail lamps 1302 or a passenger room light 1304 comes out in an image 1305 for detecting the low intensity, in addition to the tail lamps 1302. FIG. 13B gives an outline of the positions of these light spots; and, to analyze the configuration of the light spots other than the tail lamps 1302 will make it possible to discriminate a far red signal from a near vehicle such as a bus. That is, when the red light spots 1302 are extracted at a higher position than the vanishing point, and at the same time, the other light spots 1303 and 1304 are extracted above and/or below the red light spots 1302, the extracted red light spots 1302 can be determined as the light spots from the other vehicle. Here, the light spot above or below means only a light spot within a range having the X coordinates of the two red light spots 1302 as the right and left ends; and it does not include light spots in the so-called slant direction, having the X coordinates outside the range of the two red light spots 1302. Headlamp light spots 1309 in FIG. 13D, for example, are regarded as below red light spots 1308, and headlight spots 1310 are not regarded as below the red light spots 1308.

Figure 22:
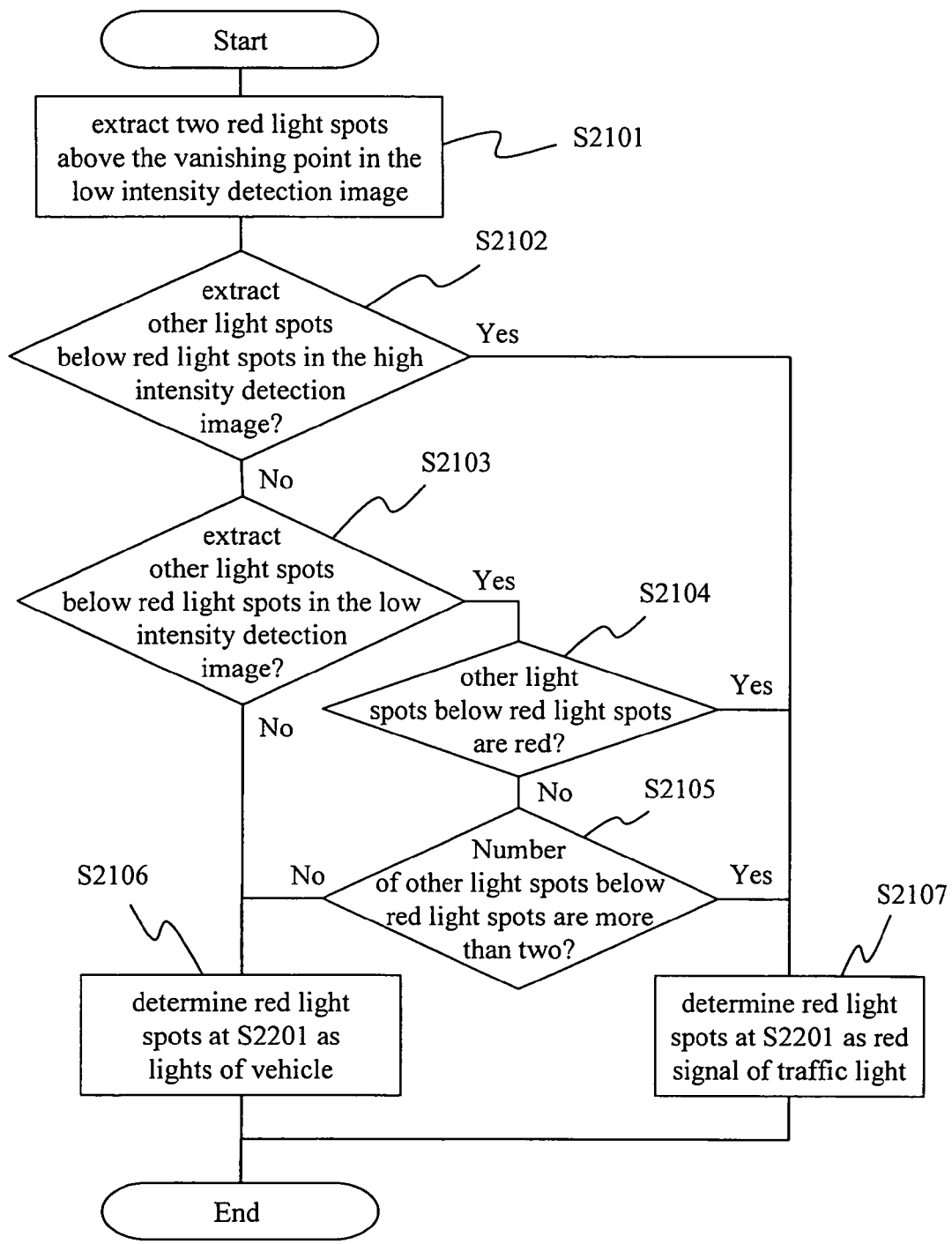
FIG. 22 illustrates a processing flow for determining a traffic light.

Next, suppose a situation that a far traffic light 1306 is the red signal and an opposing vehicle 1307 travels, as shown in FIG. 13C, and the configuration of the headlamp light spots 1309 and the far traffic light 1306 becomes just the same as that of the number plate light 1303 and the tail lamps 1302 of a bus, as shown in FIG. 13B. Even in such a case, when the other light spots extracted below the red light spots are red ones, that is, when there exists the other tail-lamp lights below the red light spots, it is possible to determine that the upper red light spots are a red signal with a high probability, and not the light spots from the other vehicle. Suppose a case that the other light spots extracted below the red light spots are not red ones. If the other light spots are the number plate light 1303 of a bus, since the quantity of light is little, they do not come out in the high intensity detection image. If they are the headlamp light spots 1309, since the quantity of light is abundant, they come out in the high intensity detection image. Utilizing this fact will make it possible to discriminate the tail lamps 1302 from the red signal of the traffic light 1306. However, it can be considered that the opposing vehicle 1307 halts by the red signal and reduces the headlights into small lamps. If the opposing vehicle 1307 in this case is far, it is conceivable that the headlamp light spots 1309 do not come out in the high intensity detection image; and the above discrimination becomes difficult. Taking all these points into consideration, the processing flow in FIG. 22 determines whether the red light spots are the light spots from the other vehicle or not.

First, when S2201 extracts red light spots at a higher position than the vanishing point in the low intensity detection image, and S2202 extracts the other light spots below the red light spots in the high intensity detection image, S2207 determines that the red light spots are not the light spots from the other vehicles. Next, when S2201 extracts red light spots at a higher position than the vanishing point in the low intensity detection image, and S2202 does not extract the other light spots below the red light spots in the high intensity detection image (No in determination at S2202), S2203 verifies whether or not the other light spots are extracted below the red light spots in the low intensity detection image. If the other light spots are extracted below the red light spots in the low intensity detection image (Yes in determination at S2203), and if they are red ones (Yes in determination at S2204), S2207 determines that the red light spots are not the light spots from the other vehicles. If they are not red ones, and there is one light spot (No in determination at S2205), since they can be a number plate light with a high probability, S2206 determines that the red light spots are the light spots from the other vehicles; and if there are more than two light spots as shown in FIG. 13D (Yes in determination at S2205), S2207 determines that the red light spots are not the light spots from the other vehicles.

Further, in order to eliminate the red signal, it is conceivable to use the periodic change of the lighting colors. That is, to analyze the change of the colors by tracking the light spots in time series from plural-sheets images photographed will make it possible to determine whether it is a traffic light. This technique brings another problem. That is, it requires tracking the light spots of the traffic light; accordingly, the cycle of fetching the images has to be set shorter. It is possible to eliminate the red signal only when the traffic light changes from the blue signal to the yellow, and to the red. If the color appeared on the screen for the first time was red, it is impossible to eliminate the red signal with this technique.

Here, the tracking signifies the process of tracking an object among animated images of plural sheets, which stores the positions of the light spots of the images for each image, and in the next image, assumes the light spot located at the most approximate position as the light spot of the same object.

Figure 14:
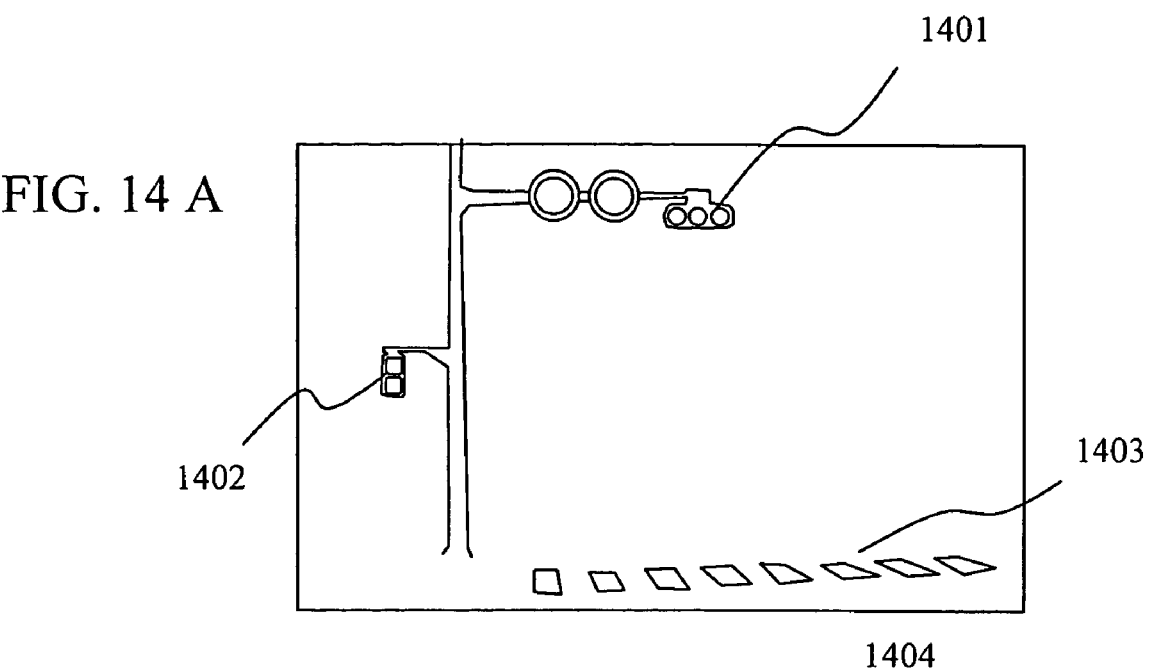
FIG. 14A illustrates and image of a traffic light for pedestrians installed near a traffic light for vehicles and a crosswalk laid on a road.
FIG. 14B shows an image of red spot lights that comes out in the slant direction
Figure 14:
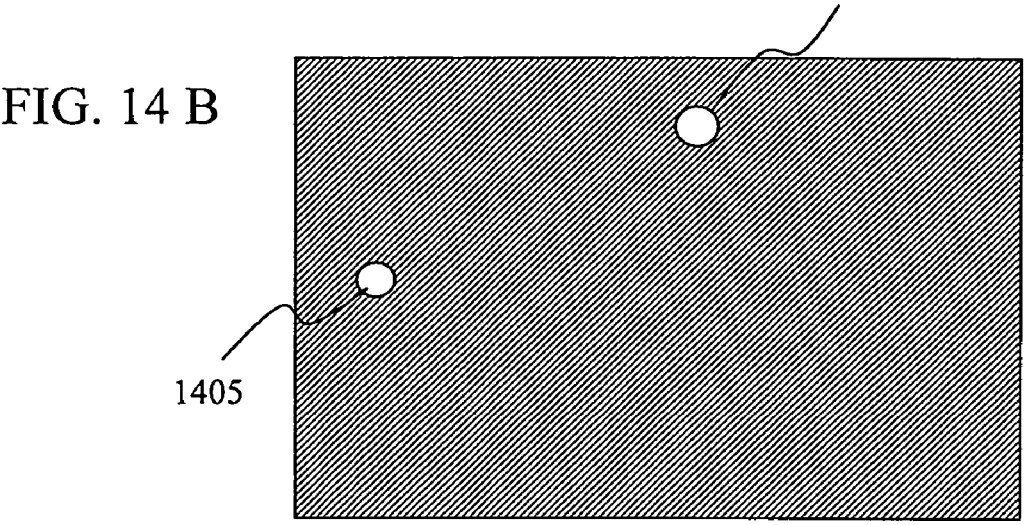
Figure 19:
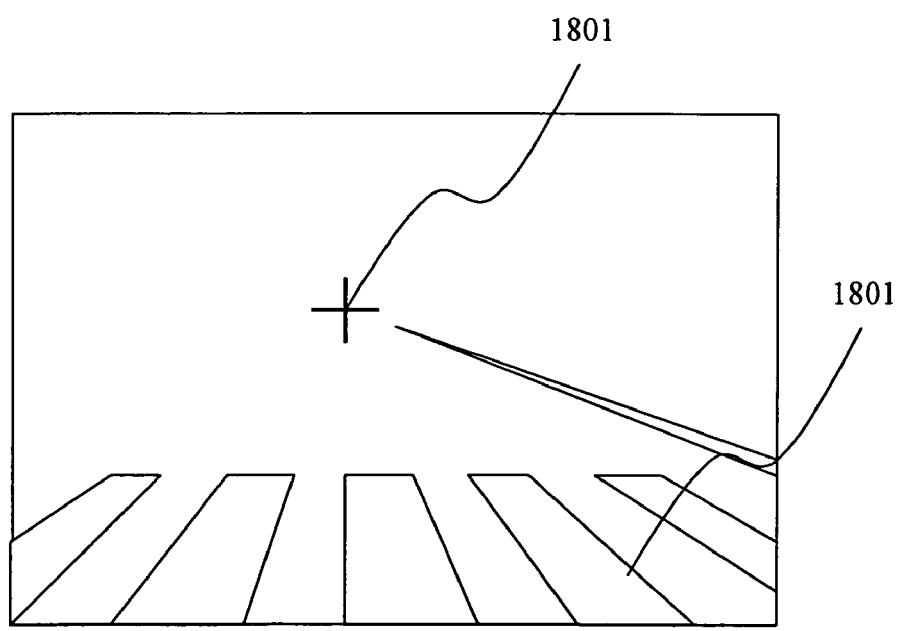
FIG. 19 illustrates a method of detecting a crosswalk relating to the embodiment 3.

Also, to eliminate the red signal, as shown in FIGS. 14A and 14B, another method detects a pedestrian traffic light 1402 located near a traffic light 1401, or a crosswalk 1403 to thereby determine it as the traffic light. Generally, the traffic light 1402 for pedestrians is positioned lower than the traffic light 1401 for vehicles, and is placed on the side of the road. Accordingly, when red light spots 1404 and 1405 are in a slant direction, they can be determined as traffic lights with a high probability. In regard to the crosswalk 1403 being another information, to detect it at night with a camera is difficult, unless the camera is approximate to it, for example, within 30 m. The traffic light comes out on the upper part of the screen by the elevation angle, from the relation of the installation height of the approximating camera and the height of the traffic light; therefore, it is possible to determine from the Y coordinates. Thus, it is advisable to accept the information of the crosswalk 1403 as suggestive information. Here, for detecting the crosswalk, the edge information of the crosswalk 1403 is used. As shown in FIG. 19, the white lines of a crosswalk 1901 point to the vanishing point; accordingly, there are many edges that point to the vanishing point. Therefore, at the stage where the number of the edges pointing to the vanishing point exceeds a predetermined threshold, it is possible to determine that the crosswalk is there on the road.

Next, the method of eliminating the reflector will be explained. The elimination of the reflector has been mentioned above. However here, when the reflector is in close range, and the reflected intensity of the headlights of the own vehicle is very high, so that the reflector comes out in the high intensity detection image 903, the method will be explained. The high intensity detection image 903 detects the white light of the headlights, and the white reflector reflects the color of the headlights as it is; therefore, it is impossible to determine and exclude the reflector based on the color. Although it is difficult to exclude all the reflectors, it is possible to exclude the reflector group installed along the lane outside the while lines, which appears comparably frequently. Concretely, the recognition of a while line is executed with an image captured under such an exposure control that makes the white line come out; and when there are several (for example, more than three) light points arrayed along the white line on the outside thereof, these light points are excluded as the reflector.

Next, the method of eliminating the light of a vending machine, etc., will be explained. Generally, the vending machine reflects a white light; therefore, the light of the vending machine can be eliminated when it comes out in the low intensity detection image 904. However, as the vending machine comes close, there is a possibility that the light of the vending machine comes out in the high intensity detection image 903. As the property of the light of the vending machine, although it comes out in the high intensity detection image 903, it has lower intensity than the headlights, and the light emitting area of the vending machine is larger. Therefore, if there is a comparably dark light spot with a comparably large area, the light spot can be determined not as the headlights or tail lamps of a vehicle, but as the light of the vending machine with a high probability. Thus, it is determined from a binary image group that is created from a gray image of the high intensity detection image 903 with plural thresholds. That is, the method decreases the binary threshold gradually, and detects the light spot segment where the light spot area sharply widens; since a dim light spot with a large area is the vending machine with a high probability, the method eliminates the light spot segment as the light spot of the vending machine.

Figure 15:
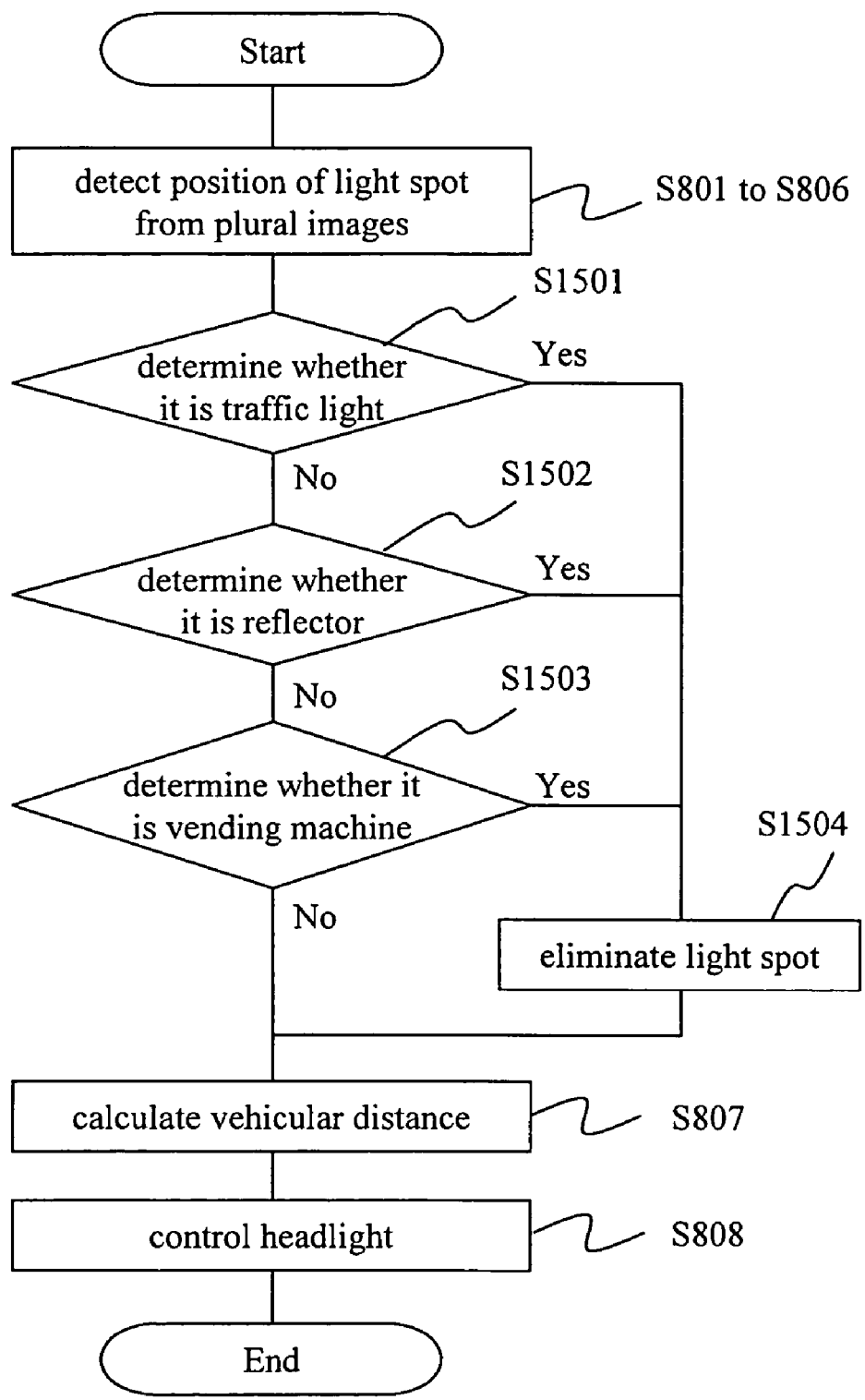
FIG. 15 illustrates a processing flow for eliminating the noise light relating to the embodiment 3.

Taking the above means of discriminating the noise lights into consideration, FIG. 15 illustrates a processing flow for eliminating the noise lights as the embodiment 3 being an advancement of the embodiment 2. The steps that detect the positions of the light spots from the plural images are the same as S801 through S807.

S1501 executes the determination of a traffic light. In case a red light spot is located at a higher position than the vanishing point, it is determined whether there are the other light spots above or below the red light spot, or whether the red light spot is the red signal of the traffic light by the aforementioned method.

S1502 executes the determination of a reflector. If the step detects a lane, and confirms that it runs parallel to the lane, it can be determined as the reflector with a high probability.

S1503 executes the determination of a vending machine. As mentioned above, this is determined from the area of a light spot and the intensity thereof.

S1504 excludes a light spot that was determined as a noise light such as a traffic light, reflector, and vending machine.

The processing after the calculation of a vehicular distance at S808 is the same as the embodiment 2, and the explanation will be omitted; however, the steps S1501 through S1504 exclude several noise lights, which further enhances the reliability of the light distribution control.

Figure 20:
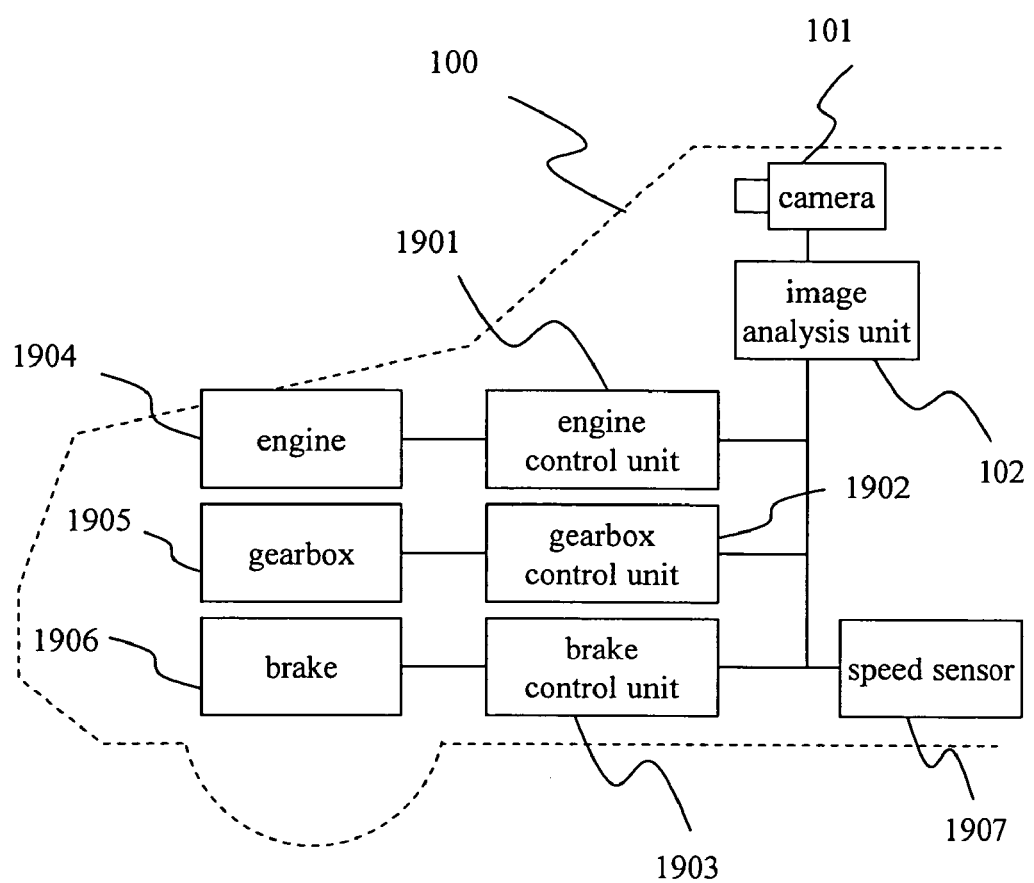
FIG. 20 illustrates a configuration of a follow-up travel control.
Figure 21:
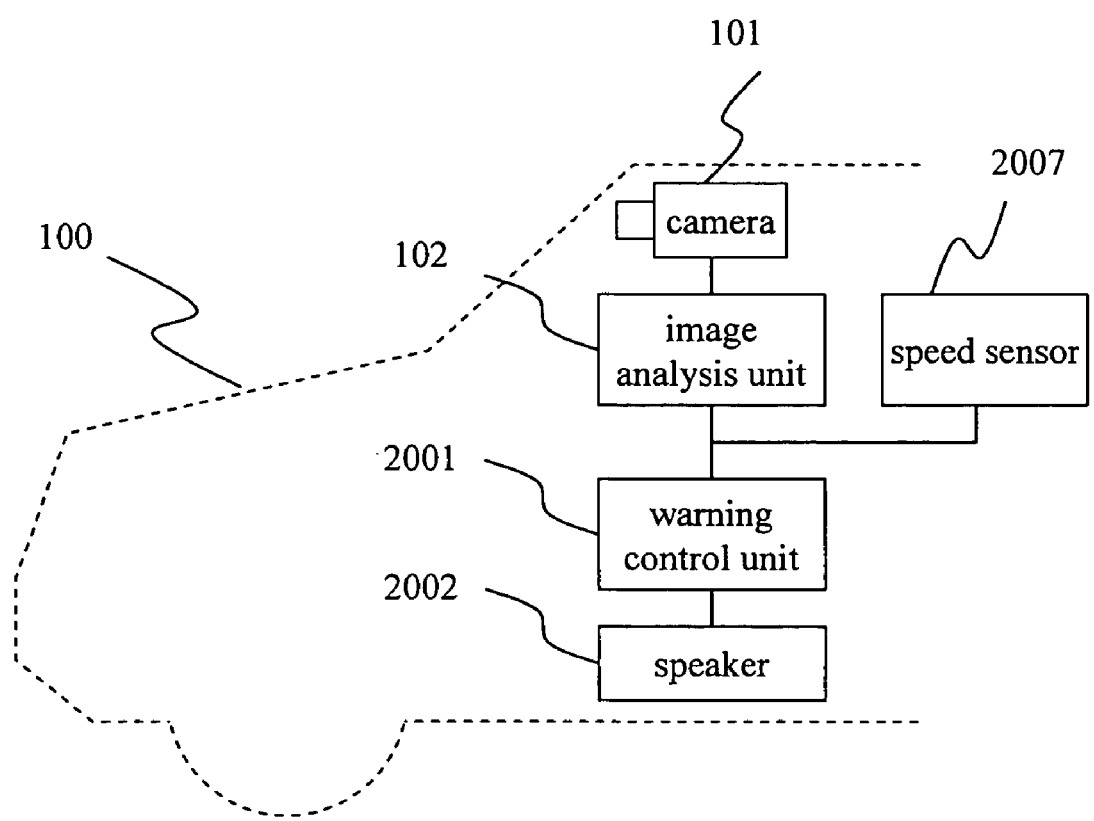
FIG. 21 illustrates a configuration of a proximity warning control.

This embodiment, while describing the light distribution control of the headlights, acquires the vehicular distance to a preceding vehicle with high precision even at night. Therefore, this embodiment can be utilized for the control of a follow-up travel to the preceding vehicle, taking the vehicular distance to the preceding vehicle into consideration. FIG. 20 illustrates a configuration of the follow-up travel control. On the basis of the distance to the preceding vehicle and the direction information calculated by the image analysis unit 102 and the speed information by a speed sensor 2007, the speed control to follow the preceding vehicle is executed by controlling an engine 2004, gearbox 2005, and brake 2006 of the own vehicle. An engine control unit 2001 controls the engine output by adjusting a throttle position of the engine, a gearbox control unit 2002 selects an optimum gear ratio on the basis of the speed of the vehicle and the engine output, and a brake control unit 2003 controls the brake 2006 as required, whereby the deceleration control can be executed. The method of this embodiment can also be applied to a technique that gives a proximity warning to a driver, when the distance to a preceding vehicle or an opposing vehicle becomes narrower than a threshold for safety. FIG. 21 illustrates a configuration of the proximity warning control. The proximity warning control uses, in the same manner as the follow-up travel control, the information of the distance to the preceding vehicle and the direction information calculated by the image analysis unit 102 and the speed information by the speed sensor 2007; and a warning control unit 2101 determines whether or not there is a danger that the own vehicle collides with the preceding vehicle, and a speaker 2102 gives a warning as needed.

Thus, using the image processing system of the invention will provide a driver with an agreeable and secure driving environment.

What is claimed is:

1. An image processing system comprising an imaging means mounted on a vehicle, and an image analysis means that acquires images photographed by the imaging means and analyzes the images;
   wherein the image analysis means acquires plural sheets of images with different exposures that the imaging means photographed, and analyzes the plural images with different exposures to detect positions of other vehicles;
   wherein the image analysis means detects light spots emitted from the other vehicles from the plural images with different exposures, and detects positions of the other vehicles;
   wherein the plural images with different exposures are an image photographed with a first exposure, and an image photographed with a second exposure greater than the first exposure;
   the image analysis means analyzes the image photographed with the first exposure to detect the positions of the light spots emitted from the other vehicles, searches a light spot area originated in the same light source as the light spot detected with the first exposure from the image photographed with the second exposure, and masks the light spot area originated in the same light source in the image photographed with the second exposure;
   wherein the image analysis means;
   calculates the nositions of the other vehicles, when there are more than two light spots in the horizontal direction of the image photographed by the imaging means, on the basis of a spacing of the two light spots;
   calculates the positions of the other vehicles, when there is one light spot in the horizontal direction of the image photographed by the imaging means, on the basis of depression angle information from the imaging means;
   wherein, when there are more than two light spots in the horizontal direction of the image photographed by the imaging means, the position of the other vehicle calculated from the spacing of the two light spots is compared with the position of the other vehicle calculated from the depression angle information of one light spot; and
   the position of the other vehicle being in a shorter distance from the own vehicle is control information for controlling the own vehicle.

2. A vehicle control system comprising an imaging means mounted on a vehicle, an image analysis means that analyzes images inputted from the imaging means to detect position information of other vehicles, and a vehicle control means that executes a vehicle control on the basis of the position information of other vehicles outputted from the image analysis means,
   wherein the image analysis means extracts light spots originated in the other vehicles from plural images with different exposures, analyzes the extracted light spot information to detect the position information of the other vehicles, and when red light spots are extracted at a higher position than a vanishing point, and at the same time other light spots are extracted above and/or below the red light spots, determines the red light spots as the light spots originated in the other vehicles.

3. A vehicle control system comprising an imaging means mounted on a vehicle, an image analysis means that analyzes images inputted from the imaging means to detect position information of other vehicles, and a vehicle control means that executes a vehicle control on the basis of the position information of other vehicles outputted from the image analysis means,
   wherein the image analysis means extracts light spots originated in the other vehicles from plural images with different exposures, analyzes the extracted light spot information to detect the position information of the other vehicles, and when red light spots are extracted at a higher position than a vanishing point, and at the same time other light spots of more than a predetermined number are extracted below the red light spots, determines that the red light spots are not the light spots originated in the other vehicles.

4. A vehicle control system according to claim 2 or claim 3, wherein the vehicle control means controls a distribution of headlights on the basis of the position information of the other vehicles.

5. A vehicle control system according to claim 2 or claim 3, wherein the vehicle control means controls a follow-up travel to a preceding vehicle on the basis of the position information of the other vehicles.

6. A vehicle control system according to claim 2 or claim 3, wherein the vehicle control means executes a proximity warning control on the basis of the position information of the other vehicles.

* * * * *